(12) United States Patent
Eastin et al.

(10) Patent No.: US 8,197,735 B2
(45) Date of Patent: Jun. 12, 2012

(54) METHODS FOR FORMING FIBERS

(75) Inventors: John Alvin Eastin, Lincoln, NE (US);
David Vu, Lincoln, NE (US)

(73) Assignee: Kamterter Products, LLC, Waverly, NE (US)

( * ) Notice: Subject to any disclaimer, the term of this patent is extended or adjusted under 35 U.S.C. 154(b) by 0 days.

(21) Appl. No.: 11/983,975

(22) Filed: Nov. 13, 2007

(65) Prior Publication Data

US 2008/0066664 A1 Mar. 20, 2008

Related U.S. Application Data

(62) Division of application No. 11/109,398, filed on Apr. 19, 2005, now Pat. No. 7,311,050.

(51) Int. Cl.
*B29C 47/88* (2006.01)

(52) U.S. Cl. ......... 264/211.14; 264/211.12; 264/211.17; 425/72.2

(58) Field of Classification Search .................. 264/640, 264/211.12, 211.14, 211.17; 111/200; 425/72.2
See application file for complete search history.

(56) References Cited

U.S. PATENT DOCUMENTS

| | | |
|---|---|---|
| 577,121 A | 2/1897 | Stock et al. |
| 903,527 A | 11/1908 | Wilbur |
| 1,900,482 A | 3/1933 | Boyd |
| 2,361,980 A | 11/1944 | Tirrell |
| 2,695,236 A | 11/1954 | Barton |
| 2,749,964 A | 6/1956 | Manning |
| 3,507,624 A | 4/1970 | Schneider et al. |
| 3,648,631 A | 3/1972 | Fiedler et al. |
| 3,741,310 A | 6/1973 | Hansen |
| 3,849,241 A | 11/1974 | Butin et al. |
| 3,861,474 A | 1/1975 | De Palma |
| 3,968,933 A | 7/1976 | Waldrum |
| 3,994,438 A | 11/1976 | Farmery |
| 4,145,203 A * | 3/1979 | Levecque et al. ............... 65/527 |
| 4,193,879 A | 3/1980 | Leach |
| 4,297,810 A | 11/1981 | Hansford |
| 4,320,595 A | 3/1982 | McClure et al. |
| 4,384,537 A | 5/1983 | duBrucq |
| 4,392,916 A | 7/1983 | Nishiyama et al. |
| 4,504,014 A | 3/1985 | Leuning |
| 4,574,150 A * | 3/1986 | Austin ............................ 536/20 |

(Continued)

FOREIGN PATENT DOCUMENTS

AU 2003248181 9/2003

(Continued)

OTHER PUBLICATIONS

*A Study of the Stability of Plane Fluid Sheets*, Hagerty, W.W. and Shea, J.F.; *Journal of Applied Mechanics*; vol. 22-23, 1955-56.

(Continued)

*Primary Examiner* — Christina Johnson
*Assistant Examiner* — Saeed Huda
(74) *Attorney, Agent, or Firm* — Suiter Swantz pc llo

(57) ABSTRACT

The configuration of a feedstock material is controlled by bringing it into contact with at least a first gas moving against it at a location with an area and thickness of the feedstock liquid that forms drops or fibers of a selected size. In one embodiment, drops of agricultural input materials are formed for spraying on agricultural fields. In another embodiment, nanofibers of materials such as chitosan or metals are formed. In another embodiment seeds are planted with gel.

10 Claims, 21 Drawing Sheets

U.S. PATENT DOCUMENTS

| | | | |
|---|---|---|---|
| 4,596,558 | A | 6/1986 | Smith et al. |
| 4,632,284 | A | 12/1986 | Erazo |
| 4,779,776 | A | 10/1988 | Erazo et al. |
| 4,820,281 | A | 4/1989 | Lawler, Jr. |
| 4,893,681 | A | 1/1990 | Flandre |
| 4,895,106 | A | 1/1990 | Barnes |
| 4,963,298 | A * | 10/1990 | Allen et al. ............... 264/12 |
| 5,092,267 | A | 3/1992 | Hajek |
| 5,244,123 | A | 9/1993 | Benedict |
| 5,417,153 | A | 5/1995 | King |
| 5,575,341 | A | 11/1996 | Baker et al. |
| 5,601,865 | A | 2/1997 | Fulger et al. |
| 5,776,214 | A | 7/1998 | Wood |
| 5,794,550 | A | 8/1998 | Chadwick |
| 5,824,339 | A | 10/1998 | Shimizu et al. |
| 5,824,797 | A | 10/1998 | Hazen |
| 5,897,821 | A | 4/1999 | Kawasaki |
| 6,214,771 | B1 | 4/2001 | Dexter |
| 6,241,164 | B1 | 6/2001 | Wolfe |
| 6,248,378 | B1 | 6/2001 | Ganan-Calvo |
| 6,382,526 | B1 | 5/2002 | Reneker et al. |
| 6,444,233 | B1 | 9/2002 | Arntzen et al. |
| 6,518,226 | B2 | 2/2003 | Volker et al. |
| 6,524,508 | B1 * | 2/2003 | Ohnishi et al. ............. 264/182 |
| 6,596,296 | B1 | 7/2003 | Nelson |
| 6,638,918 | B2 | 10/2003 | Davison et al. |
| 6,695,992 | B2 | 2/2004 | Reneker |
| 6,814,759 | B2 | 11/2004 | Larsen et al. |
| 2002/0192768 | A1 | 12/2002 | Chen et al. |
| 2003/0024806 | A1 * | 2/2003 | Foret ............................ 204/164 |
| 2003/0026837 | A1 | 2/2003 | Mathisen et al. |
| 2003/0134120 | A1 | 7/2003 | Kim et al. |
| 2003/0171710 | A1 | 9/2003 | Bassuk et al. |
| 2003/0197125 | A1 | 10/2003 | De Saro et al. |
| 2004/0102562 | A1 | 5/2004 | Butuc |
| 2005/0005509 | A1 | 1/2005 | Tindall et al. |
| 2005/0028441 | A1 | 2/2005 | Abitz et al. |
| 2005/0073075 | A1 * | 4/2005 | Chu et al. ..................... 264/465 |
| 2005/0187605 | A1 * | 8/2005 | Greenhalgh et al. ......... 623/1.15 |
| 2006/0138710 | A1 * | 6/2006 | Bryner et al. ................ 264/464 |

FOREIGN PATENT DOCUMENTS

| | | |
|---|---|---|
| CA | 1266498 | 3/1990 |
| CA | 2223444 | 7/2000 |
| CA | 2401201 | 9/2002 |
| JP | 2002241405 | 11/2001 |
| JP | 2003328292 | 4/2002 |
| WO | WO 95/05501 | 2/1995 |
| WO | WO 00/47177 | 8/2000 |
| WO | WO 01/32751 | 5/2001 |
| WO | WO 02/32210 | 4/2002 |
| WO | WO 02/55782 | 7/2002 |
| WO | WO 2005/024101 | 3/2005 |
| WO | WO 2006/039283 | 4/2006 |

OTHER PUBLICATIONS

*Hydrophobic/Hydrophilic Electrospun Membranes for Biomedical Applications*, Jiang, Fang, Hsiao, Chu Chen.

*Electrospinning of chitosan solutions in acetic acid with poly(ethylene oxide)*, Duan, Dong, Yuan, Yao; J. Biomater, *Sci. Polymer Edn*, vol. 15, No. 6, pp. 797-811 (2004).

*A Facile Method to Make Continuous, Aligned Chitosan Fibers in the Micron and Sub-micron Range Via Electrospinning for Use in Cartilage Tissue Engineering*, Vu, Eastin, Larsen.

*Chitosan-Coating of Cellulosic Materials Using an Aqueous Chitosan-$CO_2$ Solution*, Sakai, Hayano, Yoshioka, Fujieda, Saito, Yoshioka; *Polymer Journal*, vol. 34, No. 3, pp. 144-148 (2002).

*Synthesis and Evaluation of Scaffolds Prepared from Chitosan Fibers for Potential Use in Cartilage Tissue Engineering*, Subramanian, Lin, Vu, Larsen; Technical Papers of ISA, *Biomedical Sciences Instrumentation* Vo. 40, Fort Collins, CO Apr. 23-25, 2004.

*Chitin and chitosan fibres: A review*, Ravi Kumar; *Bul. Mater. Sci.*, vol. 22, No. 5, Aug. 1999, pp. 905-915.

*Preparation and characterization of biodegradable chitosan/ hydroxyapatite nanocomposite rods via in situ hybridization: a potential material as internal fixation of bone fracture*, Hu, Li, Wang, Shen; Biomaterials 25 (2004) pp. 779-785.

*Immobilization of chitosan onto poly-L-lactic acid film surface by plasma graft polymerization to control the morphology of fibrolast and liver cells*, Ding, Chen, Gao, Chang, Zhang, Kang; Biomaterials 25 (2004) 1059-1067.

*Hydroxyapatite-chitin materials as potential tissue engineered bone substitutes*, Ge, Baguenard, Lim, Wee, Khor; Biomaterials 25 (2004) 1049-1058.

*Preparation of acrylic grafted chitin for wound dressing application*, Tanodekaew, Prasitsilp, Swasdison, Thavornyutikarn, Pathsree, Pateepasen; Biomaterials 25 (2004) 1453-1460.

*New Process (Jet Cutting Method) for the Production of Spherical Beads from Highly Viscous Polymer Solutions*, Prube, Fox, Kirchhoff, Bruske, Breford, Vorlop; *Chem. Eng. Technol.* 21 (1998) pp. 29-33.

*Production of Spherical Beads by JetCutting*, Prube, Dalluhn, Breford, Vorlop; *Chem. Eng. Technol.* 23 (2000), pp. 1105-1110.

*Functional Fibers for Immobilization of Biomolecules*, Hsieh, Abbott, Ellison, Schreuder-Gibson; NTC Project: M02-CD05 (formerly M02-E05), *National Textile Center Annual Report*: Nov. 2002.

*Improvement of the Jet Cutting Method for the Preparation of Spherical Particles from Viscous Polymer Solutions*, Prube, Bruske, Breford, Vorlop; *Chem. Eng. Technol.* 21 (1998), pp. 153-157.

*Aircraft Cargo Fire Suppression Using Low Pressure Dual Fluid Water Mist and Hypoxic Air*, John Brooks; International Aero Technologies LLC, 11817 Westar Lane, Burlington, WA 98233; pp. 1-17.

*A Review of Liquid Atomization By Electrical Means*, Grace, Marunissen; *J. Aerosol Sci.*, vol. 25, No. 6, pp. 1005-1019, 1994.

*Characteristics of Pneumataic Atomization*, Gretzinger, Marshall;*A. I.Ch.E. Journal*, Jun. 1961, pp. 312-318.

*The design and performance of internal mixing multijet twin fluid atomizers*, Mullinger, Chigier; *Journal of the Institute of Fuel*, 251, Dec. 1974; pp. 251-261.

*Blast Atomiser Developments In The Central Electricity Generating Board*, Sargeant, *Proceedings of $2^{nd}$ International Conference on Liquid Atomization and Spray Systems*, ICLASS-82, 4-4, Madison, WI, 1982, pp. 131-136.

*The Mechanism of Disintegration of Liquid Sheets*, York, Stubbs, Tek; *Transactions of the ASME*, Oct. 1953, pp. 1279-1286.

*The Influence of Liquid Film Thickness on Airblast Atomization*, Rizk, Lefebvre, *Transactions of the ASME*, vol. 102, Jul. 1980, pp. 706-710.

*On the temporal instability of a two-dimensional viscous liquid sheet*, X. Li and R.S. Tankin; *J. Fluid Mech.* (1991), vol. 226, pp. 425-443.

*Preparation of chitosan-containing nanofibres by electrospinning of chitosan/poly(ethylene oxide) blend solutions*, Spasova, Manolova, Paneva, Rashkov; *e-Polymers* 2004, No. 056, pp. 1-12.

*Terminology and Definitions for Agricultural Chemical Application*, ASAE S327.2 Feb. 2003; pp. 182-185.

*Spray Mix Adjuvants for Spray Drift Mitigation*, ASAE Paper N. AA03-003; presented at 2003 ASAE/NAAA Technical Session, Reno, Nevada, Dec. 2003.

*Air Delivery Technology* by Spray-Air Technologies Ltd., power point on Shear Guard PLUS Nozzle.

*Magnetic Trapping of Multicomponent Nanowires*, Tanase, Hultgren, Searson, Meyer, Reich, Jun. 25, 2001, pp. 1-3.

*High-Pressure Sheet Atomization of Non-Newtonian Fluids*, Hartranft and Settles, Presented at ILASS-Americas $12^{th}$ annual Conference on Liquid Atomization and Spray systems, May 16-19, 1999, Indianapolis, IN.

*Annual Spray Drift Review*, Office of Pesticide Programs, Environmental Fate and Effects Division, printed from internet.

*Science and Engineering of Droplets Fundamentals and Applications* Book, Hulmin Llu.

*Biological Applications of multifunctional magnetic nanowires*, Symposium on Biological Applications, Sarah Mjetich, of Magnetic Nanostructures, Chairman, pp. 1-7.

*Electrospinning of Chitosan Dissolved In Concentrated Acetic Acid Solution*, Xinying Geng, Oh-Hyeong Kwon, Jinho Jang; *Biomaterials*; vol. 26, Mar. 19.

*Preparation of Water-Soluble Chitosan*, Shaojie Lu, Xefeng Song, Deyong Cao, Yiping Chen, Kangde Yao; *Journal of Applied Polymer Science*: vol. 91, (2004) pp. 3497-3503.

\* cited by examiner

FIG. 1

```
┌─────────────────────────────────┐
│ SET PHYSICAL AND ENERGY         │
│ CHARACTERISTICS OF FEEDSTOCK    │─12
│ MATERIAL, KINETIC ENERGY FLUID  │
│ AND FIXTURE OUTLET              │
└─────────────────────────────────┘
                │
┌─────────────────────────────────┐
│ MOVE FEEDSTOCK MATERIAL         │─14
│ TO FIXTURE OUTLET               │
└─────────────────────────────────┘
                │
┌─────────────────────────────────┐
│ FORCE KINETIC ENERGY FLUID      │
│ AGAINST FEEDSTOCK MATERIAL      │
│ AT PRESELECTED ANGLE TO OR      │─16
│ PARALLEL TO FEEDSTOCK MATERIAL  │
└─────────────────────────────────┘
                │
┌─────────────────────────────────┐
│ DISTRIBUTING THE                │
│ SHAPED DROPS, FIBERS,           │─18
│ MIST AND/OR VAPOR               │
└─────────────────────────────────┘
```

FIG. 2

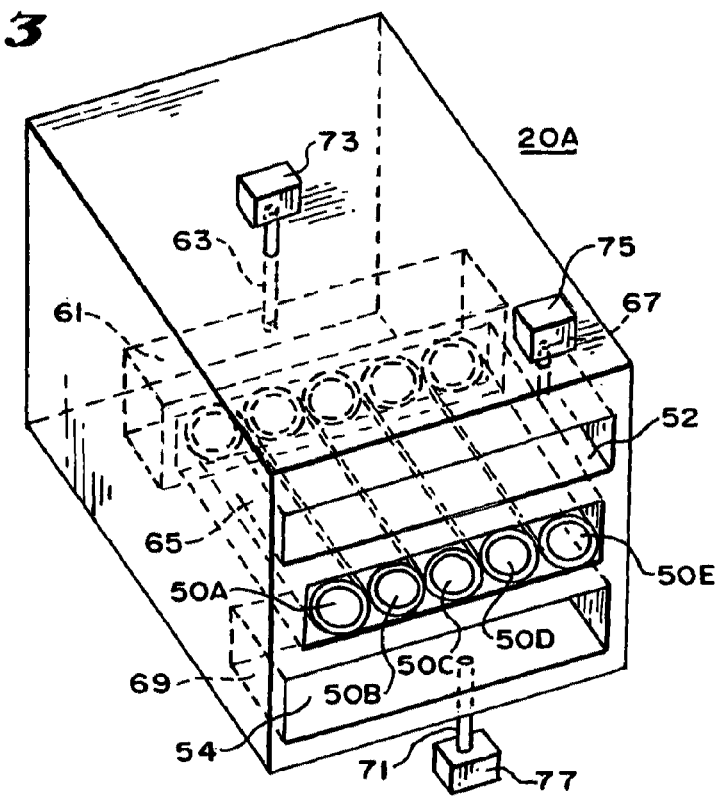
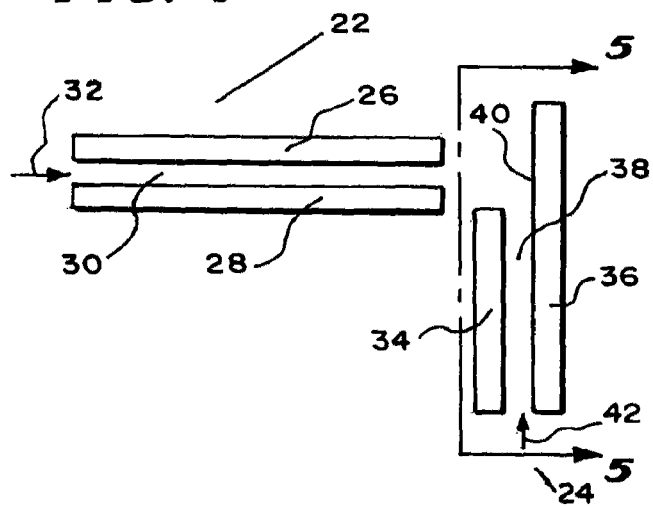
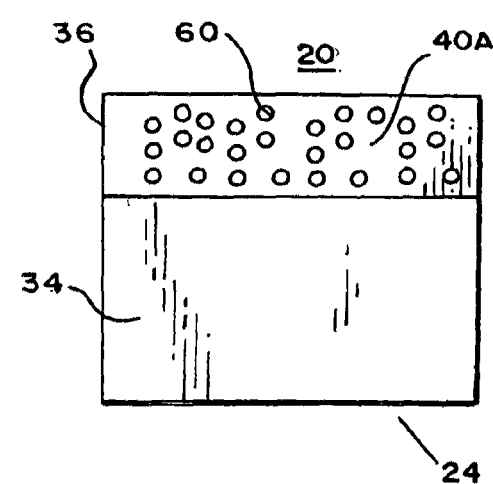
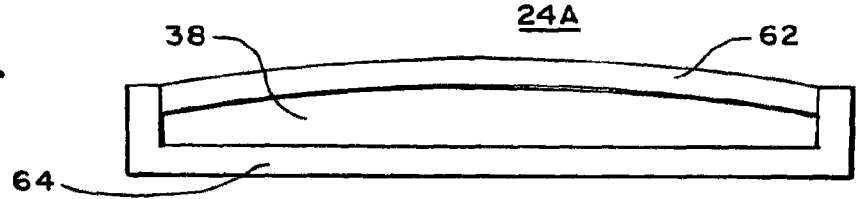

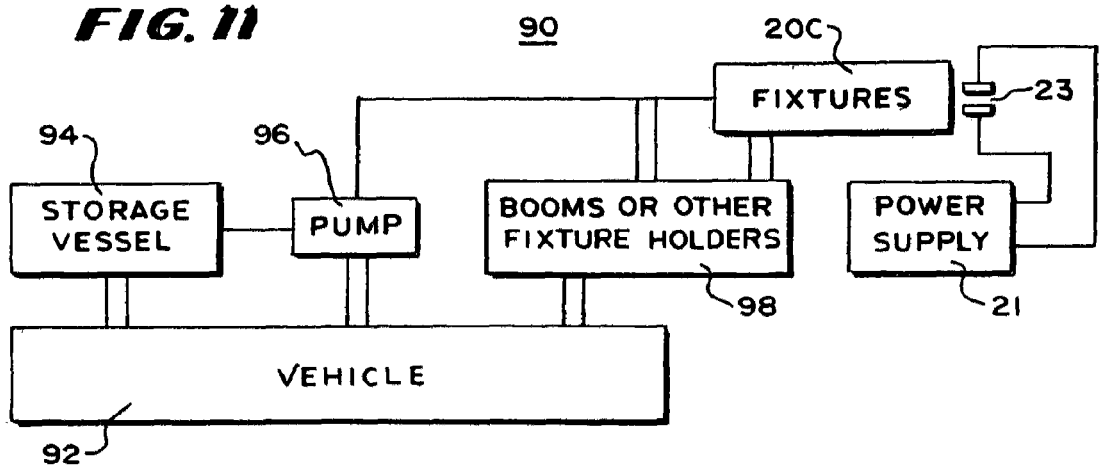
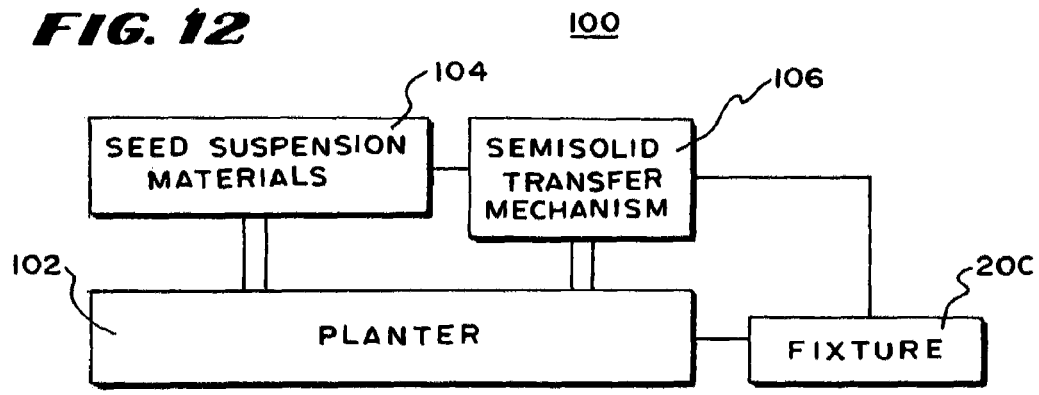
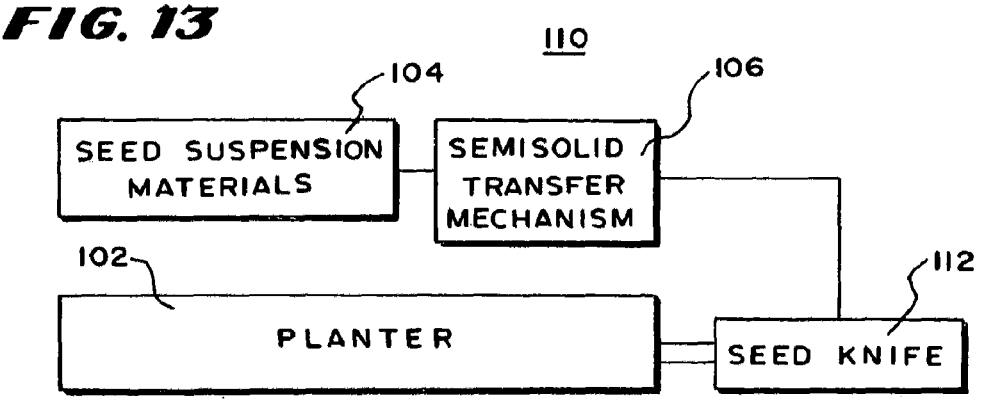

FIG. 14 — 120

- 122: FORMING A FLUIDIC CONTINUOUS MEDIUM CAPABLE OF SUSPENDING SEEDS AND MOVING THE SEEDS WITH THE CONTINUOUS MEDIUM
- 124: MIXING SEEDS IN THE CONTINUOUS MEDIUM TO FORM FLUIDIC SEMISOLID WITH RANDOMLY DISPERSED SEEDS WITHIN IT
- 126: DISTRIBUTING THE FLUIDIC SEMISOLID WITH RANDOMLY DISPERSED SEEDS WITHIN IT ON AN AGRICULTURAL FIELD

FIG. 15 — 130

- 132: PREPARING A SEED SUPPORTING MEDIUM AND INCORPORATING BENEFICIAL INPUTS WITH THE SEEDS
- 134: MIXING SEEDS IN THE SEED SUPPORTING MEDIUM TO FORM FLUIDIC SEMISOLID WITH RANDOMLY DISPERSED SEEDS WITHIN IT
- 136: DISTRIBUTING THE FLUIDIC SEMISOLID WITH RANDOMLY DISPERSED SEEDS WITHIN IT ON AN AGRICULTURAL FIELD

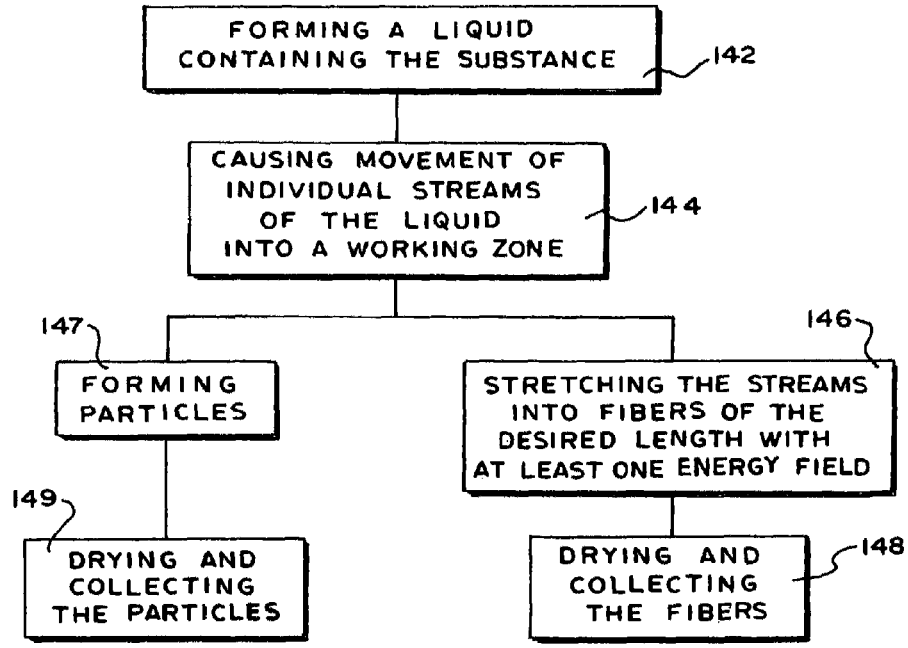
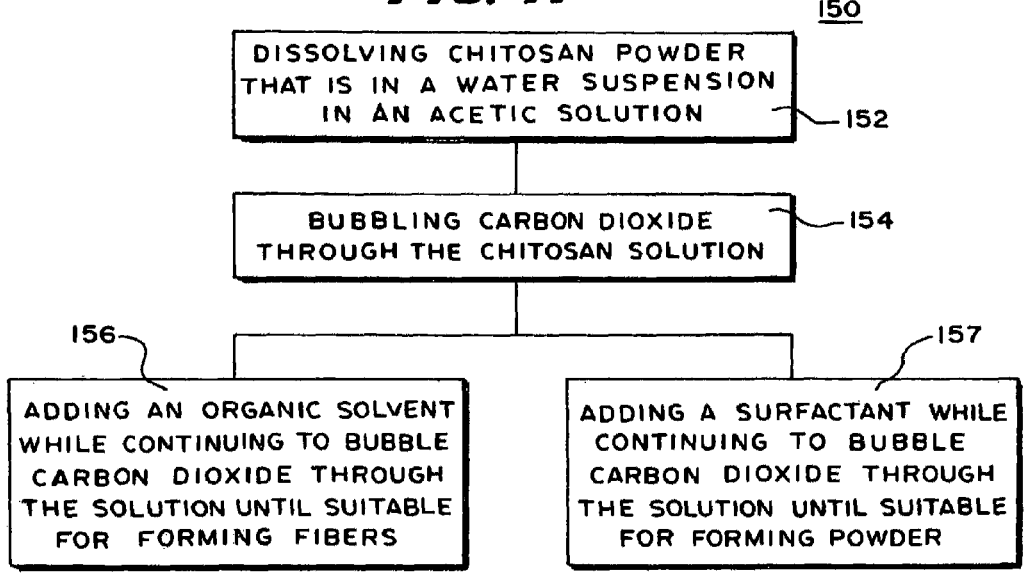

METHODS FOR FORMING FIBERS

RELATED CASES

This application is a divisional application of U.S. patent application Ser. No. 11/109,398 filed Apr. 19, 2005, entitled SYSTEMS FOR THE CONTROL AND USE OF FLUIDS AND PARTICLES by inventors, John Alvin Eastin and David Vu.

BACKGROUND OF THE INVENTION

This invention relates to the forming, shaping, control and use of fluids, fibers and particles such as for example the formulation of a pesticide, shaping it into droplets, and the distribution of the droplets over a field to control pests or the or the formulation of a soluble chitosan, the shaping it into fibers or mats or sheets and the use of the fibers, mats and sheets such as for example in biomedical applications.

It is known to shape and spray fluids with spray apparatuses. In some applications, the fluids are formed into droplets or aerosols and sprayed. In other applications, the fluids form fibers, or powders or particles.

In one prior art use of spray apparatus, agricultural input fluids are sprayed onto agricultural fields. Under some circumstances, vehicles used to spray agricultural fields carry large volumes of diluted active ingredients because it is difficult to spray more concentrated forms of the active ingredient. They may also need to be outfitted with a high pressure source of air and relatively large pumps for the liquid containing the active ingredient because high pressure air is needed to form the desired spray and a large volume of liquid containing the active ingredient must be pumped. In some systems the nozzles are relatively high above the target for the spray to permit the cone of fluid to provide an adequate area of coverage with the spray. Usually the cone angle is determined by the nozzle and has a limited angle. One reason for diluting the active ingredient is because existing spray equipment used in agriculture cannot spray viscous material with the desired size drops and drop distribution.

The prior art spray apparatuses have several disadvantages such as for example: (1) they require vehicles carrying the agricultural inputs to carry heavier weights of agricultural inputs with the associated water carrier than desirable; (2) they require the replenishment of the supply of agricultural inputs carried by the spray vehicles periodically, thus increasing the time and expense of spraying; (3) they cannot be used for the application of some beneficial microbes because the microbes are killed by the high pressure used in the prior art techniques for application of agricultural inputs; (4) the low viscosity agricultural inputs drift when sprayed; (5) some of the carriers used for dilution, such as water, have high surface tension and form beads on contact rather than spreading such as over a leaf; (6) the sprayed drops tend to break up because of lowered shear resistance, thus forming smaller drops that are subject to increased drift; (7) some of the carriers used for dilution, such as water, have unpredictable mineral content and pH variations; (8) the angle of the cone of sprayed fluid from the nozzles is small thus requiring the nozzle to be positioned at a high elevation to obtain adequate coverage but the high elevation increases drift; (9) the use of some carriers for dilution in some circumstances causes precipitation of active ingredients and (10) the prior art systems cannot effectively spray some particles such as particles that have absorbed active ingredients in them that are to be released at a later time or over a timed interval.

Spray apparatus are known for spraying viscous materials. This type of spraying apparatus has not generally been adapted for use in spraying agricultural inputs. Moreover, the known spraying apparatus for spraying viscous materials is not readily adjustable for different size droplets or particles or viscosity of the droplets and is not equipped with a convenient mechanism to adjust drop size or pattern or viscosity of the drops in the field as appropriate and thus reduce drift by conveniently adjusting drop size and viscosity in accordance with circumstances such as wind speed, height of spraying or speed such as for example by ground vehicle or airplane.

It is known to form nanofibers using electrospinning techniques. In the prior art method of forming nanofibers by electrospinning, fluids are drawn into small diameters fluid ligaments or columns and dried to form the fibers. The prior techniques for forming nanofibers have disadvantages in that they are not suitable for forming nanofibers of viscous fluids because the electric potential to adequately draw the viscous fluid is close to the break down potential of air and the system causes corona discharge before the fibers can be formed.

It is known to use chitosan as a biodegradable structural member, particularly in medical applications. Chitosan is a hydrolyzed product of chitin, that is antifungal, anti-allergic, anti-tumor, immune-activating. Chitin is a common naturally occurring material formed of glucosamine and N-acetylglucosamine units, and obtained by a chitin hydrolysis process. Chitosan fibers and mats of chitosan are thus formed by electrospinning of chitosan solutions. However, conventional chitosan solutions are undesirable for electrospinning because of their high conductivity, viscosity and surface tension. Other difficulties with putting chitosan in solution are toxicity of some solutions. While chitosan has long been known to form viscous gels in carboxylic acids such as acetic, formic, and ascorbic acid, as well as in mineral acids, it is not soluble in either water or basic solutions. In addition, all organic solvents—with the notable exception of a 3 to 1 mixture of dimethyleformamide and dinitrogen tetroxide, and some fluorine-containing solvents, which are both costly and toxic—are also unable to dissolve chitosan regardless of its degree of deacetylation (DA).

It is also known from U.S. Pat. No. 6,695,992 B2 to form nanofibers by directing an air flow against a film on a flat surface. However, with the method described in U.S. Pat. No. 6,695,992, only relatively short fibers have been obtained and at times the fibers stick to one another When attempts have been made to keep the fibers separate by magneto dynamic force the fibers stuck to each other rather than being kept separate.

In certain applications fiber deposits require a specific orientation, and there have been several prior art techniques to induce such type of structural ordering. Tanase, et al., used magnetic fields to align suspended nickel nanowires in solution. In electrospinning, grounded wheel-like bobbin collectors were used to align polyethylene oxide nanofibers. This method has one disadvantage, namely that it is impossible to adjust the rotational speed of the collector to ensure that fibers remain "continuous" i.e. without snapping due to a mismatch between the fiber deposition rate and the bobbin's angular velocity.

It is known from "Chitosan-Coating of Cellulosic Materials Using an Aqueous Chitosan-$CO_2$ Solution" Sakai et al Polymer Journal, v. 34, n. 3, pp 144-148 (2002) to coat paper and fibers with chitosan prepared in part by bubbling carbon dioxide through a chitosan solution. However, the use of carbon dioxide was to dissolve the chitosan—not to remove acid and there is no suggestion of using carbon dioxide to remove the acid.

Fluid drilling systems that supply a mixture of gel and seeds onto an agricultural field are known. One prior art fluid drilling apparatus uses impeller pumps or peristaltic pumps or the like to extrude a mixture of gel and seeds. The seeds are germinated prior to planting. Such processes are shown in United Kingdom patent 1,045,732 and U.S. Pat. No. 4,224,882. These apparatuses have a tendency to distribute seeds with irregular and poorly controlled spacing between the seeds and under some circumstances damage seeds. Moreover, they are prone to plugging from the accumulation of seeds in tubes used in the apparatus.

It is known that an internal delivery tube diameter to seed diameter ratio of 3 to 1 is desirable for delivering gel seed mixtures to a planter row. Moreover, when moving fluid gel seed mixtures in a tube, the seeds are propelled much faster at the center line of the tube than at the side walls as a function of the laminar flow conditions which exist for gels having a viscosity that suspends seeds. Because the tube-seed ratio must be so large, adequate flow for fluid drilling of large seeds requires inordinate amounts of fluid and very large pumps to get the seeds delivered. The requirements for pump size and fluid amounts increase exponentially as seed diameter increases linearly for the systems currently in use.

It has also been shown with peristaltic pump systems at seed densities in gel where the volume of gel to volume of seed ratio is less than about 4, frequent blocking of the pump inlet port by seeds is experienced. The same limitations apply to piston or air displacement systems. Gels continue to extrude while the seeds pile up at the port as the amount of seed in the mixture increases.

These disadvantages limit the flexibility of the current fluid drilling hardware for delivering large seeds and for using smaller quantities of gel to reduce gel cost per acre. Further, this ratio limitation impacts on the use of optimal concentrations of treatment chemicals or microorganisms in gels while still being able to use low total amounts of treatment per acre through using for example, gel to seed ratios of 1 to 1. Thus the physics of dispensing seeds suspended in non-Newtonian fluids imposes strict limitations on the utility of the current commercial fluid drilling hardware.

Attempts to reduce this problem have relied in some circumstances on seed detectors, and counters or timers that attempt to control the rate of dispensing of seeds in accordance with the rate of travel of a tractor. Such an approach is disclosed in U.S. Pat. No. 3,855,953. This approach has not entirely solved the problem in a satisfactory manner.

It is also known to use screw type mechanisms that receive and capture seeds carried along by a fluid such as air or water and emit the seeds one by one. Such an apparatus is disclosed in U.S. Pat. No. 2,737,314 to Anderson. This apparatus has a disadvantage of damaging seeds and being relatively complicated and unreliable.

Augers are known for conveying matter from place to place but such augers have not been successfully adapted up to now to fluid drilling apparatuses. Some such augers have utilized a stream of air at an angle to the flow of material to break off controlled lengths of the material and such an apparatus is disclosed in U.S. Pat. No. 3,846,529. However, this patent does not disclose any method of fluid drilling.

The augers used in the prior art are not designed in a manner adequate to separate seeds, to avoid plugging of the conduits carrying the seeds and gel to the nozzle from which they are to be expelled into the ground nor to maintain spacing between seeds while moving them along the auger.

It is also known to use openers and planting shoes to prepare a furrow in which to deposit seeds. The prior art planting shoes have a disadvantage when used for fluid drilling in that there is insufficient space to permit accurate deposit of gel and seeds at a location protected by the shoe.

In some prior art planters, additives such as growth stimulants, fungicides, herbicides and/or beneficial microorganisms are deposited separately from the seeds or deposited in materials such as peat. The prior art apparatus for applying additives generally deposit granules. These apparatuses have a disadvantage in that they waste expensive additives by applying them nonuniformly and at locations where they are not needed. Attempts to innoculate seeds with beneficial microorganisms have not been as successful as desired.

SUMMARY OF THE INVENTION

Accordingly, it is an object of the invention to provide a novel apparatus for handling viscous materials.

It is an further object of the invention to provide a novel apparatus for spraying viscous materials.

It is a still further object of the invention to provide a novel method and apparatus for the application of agricultural inputs.

It is a still further object of the invention to provide a novel method and apparatus for forming fibers.

It is a still further object of the invention to provide a novel method and apparatus for solubilizing chitosan.

It is a still further object of the invention to provide a novel method and apparatus for forming a biodegradable fabric with sufficient cell adhesion to be implanted in animals.

It is a still further object of the invention to provide novel apparatuses and methods for planting.

It is a still further object of the invention to provide a novel mechanism for fluid drilling seeds while keeping them properly spaced and undamaged.

It is still further object of the invention to provide a novel system for applying chemicals to fields for beneficial agricultural results.

It is a still further object of the invention to provide a novel planter.

It is a still further object of the invention to provide a novel method and apparatus for planting seed inoculated with beneficial organisms.

It is a still further object of the invention to provide a novel method and apparatus for planting seeds together with beneficial chemicals and microorganisms.

In accordance with the above and further objects of the invention, feedstock material is moved to the outlet of a fixture. At least one other material, which is a fluid, referred to herein as kinetic energy fluid because it imparts energy to the feedstock, impacts the feedstock material. The kinetic energy fluid shapes the feedstock material into a form that depends on any of several variables. The variables are physical and energy characteristics of the feedstock material, of the kinetic energy fluid and of the fixture outlet. These variables cause the formation of drops, mist, vapor, fibers or solid particles depending on their values. The feedstock material may be an agricultural input such as a pesticide, fertilizer, liquid, gel, seeds, solid with special properties such as chitosan or combinations of these and may be sprayed or used for fluid drilling or formed into and collected as fibers for agricultural, industrial, medical or other uses. The kinetic energy fluid is usually a gas such as air.

The relevant characteristics of the feed stock material, the kinetic energy fluid and fixture outlet include: (1) the physical characteristics of the feedstock material and the kinetic energy fluid; (2) the energy characteristics of the feedstock material, the kinetic energy fluid and the fixture outlet or outlets; (3) the geometry of the fixture outlet or outlets and the relationship between the outlet for the feedstock material and the kinetic energy fluid; (4) the dimensions of the fluid material outlet and the kinetic energy outlet or outlets; (5) the molecular attraction between the feedstock material, the feedstock material fixture outlet, the kinetic energy fluid and the kinetic energy fixture outlet.

The physical characteristics of the feedstock materials and the kinetic energy fluids are their density, viscosity, surface tension and vapor pressure. The energy characteristics of the feedstock materials and the kinetic energy fluids are their temperature and their energy density. By energy density herein, it is meant the rate at which the feedstock material is pumped to the fixture outlet, the velocity and pressure at which the kinetic energy fluid or other energy source contacts the feedstock material and external energy that may be applied such as piezoelectric, ultrasonic, electrodynamic forces or electric field forces. It includes the enthalpy of the feedstock material and kinetic energy fluids and energy that can be imparted by other sources such as for example, the application of charge to the output feedstock material or vibration of the feedstock material.

The geometry of the fixture outlet or outlets includes their shape, such as being an elongated slit that extrudes a sheet of feedstock material or kinetic energy fluid or a circular or specially shaped slit that extrudes a column or any other particular geometric shape. The dimensions will be reflected by the shape but also sizes such as the width of the path being swept by the kinetic energy fluid, the length of the path, the roughness of the path, fluid viscosity, surface tension, the thickness of the feedstock and the angle at which the kinetic energy fluid impacts the feedstock material.

In one significant aspect of this invention, droplet size and size distributions of sprayed agricultural inputs to agricultural fields are controlled. For example, viscous agricultural products that would, in prior art practice, be diluted so they are no longer viscous and then sprayed, instead can be sprayed in their viscous form with a drop size that will maximize the usefulness of the droplets. Certain pesticides for example, that in the prior art are techniques are diluted and sprayed at high cost because of the heavy weight of water carrier that must be carried by spray vehicles and need for frequent replenishing of the supply on the spray vehicles, can be sprayed in a more concentrated form using the equipment and processes of this invention at much lower cost. Moreover, the droplets formed by the prior art equipment are frequently carried by the wind and become an environmental problem. However, with the method and apparatus of this invention, the problem of drift is reduced.

Another significant aspect of the invention is the formation of fibers and powders, particularly nano fibers and mats or thin membranes formed of fibers and powders having diameters in the nanometer range. A fixture having small diameter tubes or needles to supply feedstock to a working area where it is impacted by a stretching force can generate thin fibers of many materials that otherwise would be difficult to form in narrow fibers. In the preferred embodiment, the stretching force is supplied principally by two kinetic energy fluids, having different velocities and impacting different portions of the feedstock material. In some ranges of kinetic energy fluid, powders of the same materials can be formed. One material that is formed into fibers, or mats of thin membranes or powders is chitosan. Chitosan is a biodegradable material which, if formed into mats and fibers containing both hydrophilic and hydrophobic materials of certain preferred compositions, is desirable for implanting during medical procedures. Electrospinning is a technique commonly used to obtain nano fibers but this technique is difficult to use with certain materials including chitosan and certain other materials because the fibers that are formed are at best very short or have larger diameters than desirable. However, it has been found that chitosan can be solubilized with an acidic acid solution and result in a superior soluble composition for use in electro spinning or result in economical formation of powders. Moreover, electro spinning using the techniques of this invention can result in long nanofibers that are superior to what have been obtainable in the past and can be used to form mats that are desirable for medical purposes. One use of powders is in encapsulation of liquids for later release or encapsulation of other items such as seeds to increase size or improve and identification or detection such as with color or with fluorescence or for protection of the item.

To plant the seeds, they are mixed with a gel, which gel may include additives or additives may be added after the seeds and the gel are mixed. Additives may also be supplied from a separate source of gel to the seed trench. The gel is in a ratio of no more than three parts by volume of gel to one part by volume of seed although the exact ratio differs from seed to seed. It is sufficiently viscous to support the seeds and must have a viscosity of at least 180 centipoises. Generally the viscosity of the gel is related to the density of the seeds and should be within 20 percent of the density of the seed and have a viscosity sufficient to hold seeds for at least 10 minutes in suspension without dropping more than 6 inches.

In this process a storage vessel communicates with a fixture through a semisolid transfer mechanism such as an auger. The storage vessel contains semisolids, viscous liquids gels or powders, hereinafter referred to as "seed suspension materials" in which seeds are suspended or maintained spaced from each other for a period of time sufficient for fluid drilling. There is enough high density material including particles within the seed suspension materials to exert force on solid particles such as seeds and move them with the seed suspension materials rather than causing the seed suspension materials to flow around the seeds when force is applied. This combination permits seeds that are randomly distributed in the seed suspension materials to be moved by an auger and eventually dispersed through the fixture.

The fixture may be adapted to spray the seed suspension materials and small seeds or to apply a gel and larger seeds to a trough. The seed and seed suspension materials may also be removed at the end of the auger by a seed knife which may be an air burst or a solid member that scrapes the material into the trough. In this process, the seed suspension material may be a material of sufficient density or a colloidal suspension having a density and viscosity that is sufficient so that the seeds will be extremely slow in settling. The seeds should be supported without settling more than 10 percent and preferably less than 5 percent in the period of time between mixing the seeds in the medium and planting. Normally, this time will be less than a 24 hour period since commonly the farmer will mix the seeds and medium in the same 24 hour time period as he plants.

To obtain adequate mixing, the seeds should have force directly applied to them. This can be accomplished by mixing into the medium a sufficient amount of solid and semi-solid particles so that there is contact through the solid particles and the moving surfaces applying force for mixing In one embodiment, this mixture is moved by an auger to a furrow for planting and sections of it as appropriate for the number of seeds are removed from the end of the auger into the furrow. This can be done with a substantially conventional planter. The auger will be synchronized normally with the speed of the planter which may be received from the wheel speed or any other proportional area.

The total acreage being utilized may be measured by a conventional global positioning system for purposes of monitoring the amount of seed being dispersed and, under some circumstances, for accounting purposes such as billing or the like. In this specification, a fluidic continuous medium capable of suspending seeds and moving the seeds with the continuous medium while the seeds remain randomly distributed will be called a "seed-supporting medium".

The auger has pitch angles on the screw graduated from low angles at the inlet to facilitate feeding the seed gel mixture to higher angles in the delivery tube section to give a friction pumping surface to move the gel seed mix. The screw in effect provides a shear surface motive force for delivering the seed and fluid mixture while at the same time providing a moving delivery tube wall to dislodge any Seed pile ups and further, it effectively singulates seeds into the delivery exit port.

In one embodiment, the seed suspension material is hospitable to and incorporates microorganisms and chemicals beneficial to the seeds that are to be suspended in them. The beneficial inputs may be bio-chemicals or beneficial microorganisms which can be inoculated onto the seed surface and sustained by the appropriate seed and microbe supporting medium. Many of the most suitable materials for inoculating seeds with beneficial chemicals and microorganisms are semisolids and viscous humectant that can be supplied with the appropriate seeds with a fixture in accordance with this invention.

In one embodiment, the mixture of gel and seed is placed in a hopper which communicates at its bottom with an auger: (1) having grooves between threads sufficiently wide to encompass at least two seeds within the matrix; (2) having trailing edges on the threads of the auger curved to provide a shear plate force to move the seeds with the auger without causing seeds to be removed from the viscoelastic suspending fluid mixture; and (3) being between three inches and 18 inches long. The auger rotates at a speed sufficient to cause the shear surfaces of the auger mechanism to deliver seed particles to the seed dispensing port at the rate desired for planting. The viscoelastic characteristics and suspension ability of the seed suspending medium are designed to move the seeds and suspension fluid through the system within ratio changes.

At the end of the auger, there is a tubular portion into which the seed gel is inserted, with the tubular portion being vibrated when necessary by an external vibrator with sufficient maximum force intensity or maximum acceleration and distance amplitude to maintain the seeds in suspension as they are forced to the tip. A cutting mechanism, such as air flow, removes the seeds from the tip, causing them to be dropped into a furrow prepared by the planter. The air must be directed toward the ground and must not deviate within 45 degrees from a perpendicular to the ground in a plane perpendicular to the axis of the auger and 75 degrees in a plane aligned with the longitudinal axis of the auger.

The planter may be conventional and include conventional openers but because more space is needed to accommodate the gel delivery system than many conventional systems with seed delivery tubes, a planting shoe is used having a shield portion for the type, size and rate of seed being delivered so as to receive a gel delivery tube and seed separator in close enough proximity to the seed trench to avoid blocking of nozzles by soil from the trench preparation, or moving of the seed and gel from its proper position by wind or planting system movement.

In one embodiment a separate second gel delivery system is used adjacent to the seed and gel system to deliver gel with additives into the seed trench. Moreover, such a gel delivery system may be used to broadcast or band apply chemicals to fields separately from planting. The spacing of seeds from each other in a row may be controlled by intermittently stopping the air flow of the seeds in one embodiment. This may be done by temporarily interrupting the air flow such as the blower or by blocking the air nozzle.

From the above summary of the invention, it can be understood that the spray method and apparatus of this invention has several advantages such as for example: (1) vehicles and aircraft used for applying agricultural inputs to fields to do not need to carry as heavy a load of agricultural inputs, for example, they can carry the same active ingredients as prior art agricultural inputs with a reduction in water of as much as 90 percent; (2) they reduce or eliminate the requirement for periodic addition of water carrier for agricultural inputs, thus reducing the time and expense of spraying; (3) they permit the application of some beneficial microbes with seeds because the agricultural inputs containing microbes can be applied at pressures low enough to avoid killing the microbes and in viscous humectant fluids that facilitate beneficial microbe infection; (4) the high viscosity, relatively large drop size and narrow size distribution of the agricultural inputs reduce drift when sprayed; (5) it is possible to avoid diluting agricultural inputs with carriers such as water that have high surface tension and form beads on contact rather than spreading such as over a leaf; 6) drops of agricultural inputs with greater shear resistance can be used to reduce the breaking up of the drops and the resulting increase in drop size distribution, reduction in drop size and increased drift; (7) it is not necessary to add carriers used for dilution, such as water, that have unpredictable mineral content and pH variations; (8) the tendency for active ingredients to precipitate out with time because of the addition of carriers is reduced; and (9) in particular embodiments, the particle droplet size carrying active ingredients and formulation carrier chemistry can be regulated and thus provide better penetration into a host.

It can be further understood from the above description that the planter in accordance with this invention has several advantages such as: (1) it can provide effective fluid drilling with adequate separation of seeds; (2) it can provide planting of seeds with superior beneficial microbe inoculation characteristics; (3) it can combine effective planting with beneficial chemical and microbial additives; (4) it provides good separation of seeds being planted without repeated mixing of the fluid and the seeds, (5) there is less damage to seed because of controlled priming in the presence of air and controlled water uptake; (6) it is economical in the use of gel per acre; (7) there is less damage to seeds in the planting operation; (8) the seeds may be controlled for spacing in a superior manner to prior art drilling; (9) there is good control over uniformity in time of emergence of the plants from the seeds; and (10) it facilitates addition of seed protection additive economically.

It can also be understood from the summary of the invention that the method, formulations and apparatus for forming fibers in accordance with this invention has several advantages, such as: (1) longer fibers can be formed; (2) chitosan fibers, mats, sheets and powders can be more economically and better formed; (3) fibers can be formed without electrospinning; and (4) fibers and powders can be formed more efficiently and faster.

BRIEF DESCRIPTION OF THE DRAWINGS

FIG. 1 is a flow diagram of a method for forming drops, fibers, mists and/or vapor in accordance with an embodiment of the invention;

FIG. 2 is a simplified perspective drawing of one embodiment of spray system in accordance with the invention;

FIG. 3 is simplified perspective drawing of one embodiment of fiber generating fixture used in accordance with an embodiment of the invention;

FIG. 4 is a side view of the embodiment of spray apparatus of FIG. 2;

FIG. 5 is a sectional view taken through lines 5-5 illustrating a possible variation of the embodiment of FIGS. 2 and 4;

FIG. 6 is a fragmentary front elevational view of an embodiment of the invention;

FIG. 11 is a schematic block diagram of a spray apparatus in accordance with an embodiment of the invention;

FIG. 12 is a schematic block diagram of a planter particle in accordance with an embodiment of the invention;

FIG. 13 is a schematic block diagram of another embodiment of planter in accordance with the invention;

FIG. 14 is a flow diagram of a process for planting in accordance with an embodiment of the invention;

FIG. 15 is a flow diagram of another embodiment of a system for planting in accordance with the invention;

FIG. 16 is a flow diagram of a process for forming fibers in accordance with an embodiment of the invention;

FIG. 17 is a flow diagram of a process for forming a liquid or semi-solid suitable for use in the embodiment of FIG. 16;

DETAILED DESCRIPTION

Figure 7:
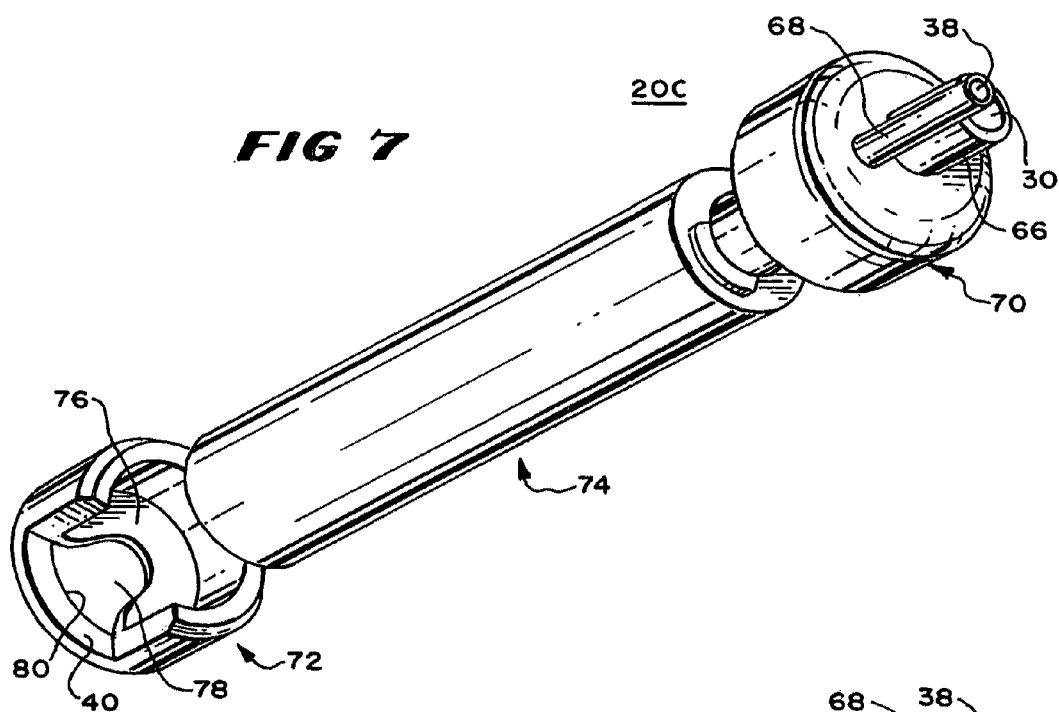
FIG. 7 is a perspective of one embodiment of spray apparatus in accordance with invention.

In FIG. 1, there is shown a block diagram of a process 10 for shaping and distributing fluid and/or particles and fibers or other solid particles made from fluids in accordance with an embodiment of this invention having the step 12 of setting the physical and energy characteristics of feedstock material, kinetic energy fluid and fixture outlet, the step 14 of moving feedstock material to a fixture outlet, the step 16 of forcing the kinetic energy fluid against the feedstock material at a preselected angle to or parallel to the feedstock material and collecting or distributing the shaped mist, vapor, drops, fibers or particles as individual drops, fibers or particles or as groups or patterns of drops, fibers or particles. In this specification, the word "distributing shall mean any form of moving, collecting, spraying or otherwise disposing of the groups, patterns or individual distributed drops, fibers, particles, vapor or mist. In this specification, "spray fixture" shall mean an apparatus adapted to be connected to a source of feedstock material and to a force for powering the feedstock material through the apparatus, the apparatus including an outlet and structure for controlling the output of feedstock material from the outlet of the Spray Fixture.

The step 12 of setting the physical and energy characteristics of feedstock material, kinetic energy fluid and fixture outlet includes the steps of: (1) establishing the physical characteristics of feedstock material and a kinetic energy fluid; (2) establishing the energy characteristics of the feedstock material, kinetic energy fluid and the passageways through which they will flow; (3) establishing the geometry of the passageway for the feedstock material and the passageway or passageways for the kinetic energy fluid or fluids and the relationship between the passageways such as the angles with respect to each other; (4) the dimensions of the passageways; and (5) the physical and molecular attraction between the passageways and the feedstock material and kinetic energy fluid. The feedstock material will generally be a liquid or semisolid but can contain solids in suspension. In this specification, feedstock materials, kinetic energy fluids and passageways that have been prepared to produce a desired shape and distribution, they are referred to as compatibly-selected feedstock materials, kinetic energy fluids and passageways.

In general, this process, controls the configuration of a substance by bringing a compatibly-selected feedstock material and at least a first moving compatibly-selected kinetic energy fluid in contact with each other. In doing this at least one of the pressures of the compatibly-selected kinetic energy fluid, the velocity of the compatibly-selected kinetic energy fluid, the velocity of the compatibly-selected feedstock material, the thickness of the compatibly-selected feedstock material, the width of the compatibly-selected kinetic energy fluid, the width of the compatibly-selected feedstock material, the temperature of the compatibly-selected feedstock material, the viscosity of the compatibly-selected feedstock material and/or the characteristics of externally applied energy or disruptive forces, if any, is varied. The compatibly-selected kinetic energy fluid is usually a gas, such as air.

The process is useful with all kinds of fluids but is particularly useful with viscous liquids or semisolids or particles such as seeds within a liquid or semisolid or just particles without a liquid or semisolid because of the difficulty of handling these materials with prior art devices. In this specification the words "formable material" means liquids that flow and assume the shape of the container holding them but are not gases that expand to fill their container and very viscous materials or semisolids that may hold their shape but can be shaped without grinding or cutting the material such as only with the use of pressure (semisolids and very viscous materials are sometimes referred to as non-Newtonian fluids). This definition applied even if particles are included in formable material.

The kinetic energy fluid is a fluid that impacts upon the feedstock material and aids in shaping it into the desired form. The desired form may be drops or long strands that will harden into fibers. In one embodiment, the feedstock material includes chitosan which is shaped into nano fibers. The kinetic energy fluid will frequently be air but other fluids can be used. Of course, there may be more than one feedstock material and more than one kinetic energy fluid. The fixture is the device through which the feedstock material and kinetic energy fluids flow and has a fixture outlet which will distribute the final product. Thus, the fixture outlet will control the angle with which the kinetic energy fluid impacts on the feedstock material and the area of that impact. The geometry of the outlet of the fixture can determine the thickness of the feedstock material and the shape and the pattern of the feedstock distribution. For example, it can include needles that extrude columns of a fluid with the kinetic energy fluid flowing substantially parallel to them and at different speeds on different sides of the column of feedstock material to stretch it into nano fibers. On the other hand, the feedstock material may be extruded as a sheet and a sheet of kinetic energy fluid may impact it on one side and form it into droplets.

Some of the relevant physical characteristics of the feedstock material and the kinetic energy fluid are their densities, viscosities, the surface tension and vapor pressure. The energy characteristics of the two fluids include their temperature and energy density. By energy density, in this specification, the words "energy density" shall mean the enthalpy per unit volume. Thus, it will be effected by the rate at which the feedstock material is pumped to the impact location with the kinetic energy fluid, the velocity of the kinetic energy fluid and its mass and external energy such as electro dynamic fields or electric fields or mechanical vibrations.

Geometry also takes into consideration the width of the path being swept by the kinetic energy, the length of the path being swept by the kinetic energy, the roughness of the path being swept by the kinetic energy, the thickness of the feedstock, the angle at which the kinetic energy fluid hits the feedstock, the dimensions of the kinetic energy fluid and the feedstock material. Molecular attraction means the attraction at the molecular level between the fluid and the material of the passageways through which it flows.

This process may effect the length of a fiber that is formed and its thickness. It may result in forming droplets, mist, vapor and particles and the shape, pattern, density of the pattern, temperature and size distribution for droplets, mist or vapor and particles.

The step 14 of moving the feedstock material to the fixture outlet also will effect the size of the droplets or cluster of particles or the thinness of a fiber when taken in conjunction to the kinetic energy fluid effects. However, in a preferred embodiment, the feedstock material is moved relatively slowly under very low pressure or no pumping at all since in some embodiments, it can rely on capillary action together with the pulling effect of the kinetic energy fluid.

The step 16 of forcing the kinetic energy fluid against the feedstock material at a preselected angle or parallel to the feedstock material can have a drastic effect on the particle size, size distribution of particles or on the length of fiber that is prepared. Variations in the angle in many instances have a dominating effect on the nature of the flow from the outlet.

The step 18 of collecting or distributing the shaped drops or fibers includes many varieties. In one case, drops of an agricultural input are simply sprayed from a series of outlets on a boom such as for example, onto crops. The term, "agricultural input" in this specification means any of the inputs that are applied to agricultural field such as fertilizer, growth regulator, pesticide, drilling gel or the like. In other cases, the fibers can be collected as a continuous strand on a drum or by a moving surface. The collection is often aided by magnetic attraction. The fibers may be charged and drawn to a collection surface containing the opposite charge.

In FIG. 2, there is shown one embodiment 20 of a device for controlling the formation of particles and fluids including a first flow path 22 for a fluid and second flow path 24 for a second fluid which are at an angle to each other so as to form a fixture outlet. In one application of the embodiment of FIG. 2, the two flow paths accommodate a feedstock material and a kinetic energy fluid which impact each other at the outlet to form droplets of a viscous material which may be a fertilizer or pesticide. For this purpose, the flow paths are wide to permit the viscous material to spread on a surface and the kinetic energy fluid to contact it and break it into relatively uniform droplets with a relatively narrow sized distribution of droplets.

For this purpose, the second flow path 24 has two plates with facing surfaces between which the feedstock material flows upwardly as shown by the arrows 42 through the path 38 and up against the surface 40. The two plates 34 and 36 are spaced to maintain a relatively thin layer of viscous feedstock material. The thickness of the layer, the width and length of the exposed surface 40 that is contacted by the kinetic energy fluid and the angle of the contact as well as the pressure of the compatibly-selected kinetic energy fluid, a velocity of the kinetic energy fluid are all material to the size of the droplets and the size distribution. The flow path 22 similarly includes first and second plates 26 and 28 defining a flow path 30 between them for the kinetic energy fluid. The fluid proceeds towards the surface 40 as indicated by the arrows 32. While the angle is substantially orthogonal in FIG. 2, generally it will be a much more acute angle for impact to obtain drops within a narrow side range and of such a size that with a viscous material, spray drift is substantially reduced.

In FIG. 3, there is shown another embodiment of a system for controlling the formation of liquids, which system 20B forms thin streams of liquid compatibly-selected feedstock material that harden into fibers rather than drops or mists or vapor as in the case of other embodiments. For this purpose, the system 20A includes as its principal parts a housing 56, a plurality of needles, the needles 50A-50E being shown for illustration and at least two kinetic energy fluid passageways 52 and 54. The needles 50A-50E are mounted within the housing and connected to a manifold 61 having an inlet tube 63 which supplies feedstock material to the needles 50A-50E at a rate regulated by the regulator 73 connected to the inlet tube 63. The feedstock material is supplied at no pressure or very low pressure under the control of a pump or regulator 73 which may be a valve connected to the inlet tube 63 to a container of a substance such as chitosan or any other material from which it is desirable to make fibers. Each of the two kinetic energy fluid passageways 52 and 54 is on an opposite side of the feedstock material and flow a different rates to stretch the streams into very thin fibers such as nanofibers.

To supply a first kinetic energy fluid through the first kinetic energy fluid passageway 52, a regulator 75, which may be a valve supplies a first kinetic energy fluid such as air at a first flow rate to a compartment 65 through a tube 67. This compartment is sized to overlie the path of the feedstock material to supply kinetic energy fluid in a path substantially parallel and in intimate contact with or only spaced a short distance from the feedstock material. To supply the second kinetic energy fluid through the second kinetic energy fluid passageway 54, a regulator 77 similar to the regulator 75 but set to cause a different flow rate at a similarly low pressure connects kinetic energy fluid to a second compartment 69 on the opposite side of the feedstock from the path of the first kinetic energy fluid and similarly in intimate contact with or spaced a short distance from the feedstock material. The two kinetic energy fluids are close enough to exert force on the feedstock material in a manner that stretches the feedstock material to form narrow fibers having a diameter related to the difference in velocity of the two fluids.

In operation, a hardenable feedstock fluid is forced relatively slowly out of the openings 50A-50E while on one side of the openings a first kinetic energy fluid from the first kinetic energy passageway 52 impinges on the feedstock in a path that is nearly parallel to the relatively slow flow of feedstock material through the needle openings 50A-50C, and at the same time a second kinetic fluid stream flows through the passageway 54 at a different velocity to create a stretching pressure on the opposite side of the feedstock material. This differential velocity when taken together with the viscosity, surface tension and solvent characteristics of the feedstock material determines the amount of stretching before the feedstock material hardens into fibers. By controlling these parameters, nano fibers may be formed of very viscous materials such as solutions of chitosan at high rates.

While two openings for kinetic fluid, one above all of the needles and one below all of the needles are used in the embodiment of FIG. 3, more than two can be used. For example, there could be one pair of kinetic fluid paths for each needle, such as below and above or on each side to provide the stretching force. The kinetic energy fluids are usually air but can be any other fluid compatible with the process. For example, nitrogen could be used. Moreover, the stretching can be done in stages with more than one pair or the pressure differential can be provided between a stationary surface and a fluid. Moreover, while only a velocity difference between two gases is used to create stretching in the embodiment 20B, other energy forms can be used in addition to the use of two gases or instead of the two gases such as electrodynamic force or a differential between a gas and a liquid or a gas and a solid surface under certain circumstances. Preferably, the circumstances of the application of force does not cause premature breaking of the streams of feedstock material. It has been found that materials that have been difficult to draw into nanofibers have the appropriate viscosity to be successfully drawn into nanofibers by two air streams. In this specification, fibers or particles formed between two of more fluids with flow rates faster than the feedstock material are referred to as "kinetic-energy fluid shaped" fibers or particles and the process of forming them is called "kinetic-energy fluid formation".

In FIG. 4, there is shown a side view of the system 20 shown in perspective in FIG. 2, having a first flow path 22 and the second flow path 24. The first flow path 22 is formed of plates 26 and 28 through which the kinetic energy solution flows through the passageway 30 between the plates 26 and 28. The second flow path 38 receives the feedstock material flowing in the direction 42. It is bounded by the plates 34 and 40. As best shown in this view, the kinetic energy fluid flows through the path 30 against the surface 40 which extends beyond the plate 34 on the plate 36 to provide a length of feedstock material which is impacted.

In FIG. 5, there is shown a sectional view through the lines 5-5 of FIG. 4, having the passageway 24 with the plate 34 shown in front and the plate 36 behind it to expose a surface 40A. The surface 40A differs from the surface 40 of FIGS. 2 and 4 by the presence of rough spots which may be projections or indentations or grooves or any other configuration depending upon the effect desired, one projection for example being shown at 60.

In FIG. 6, there is shown an end view of the second flow path 24A through which the feedstock material 38 may flow before impacting with a kinetic energy fluid from the first flow path 22 (FIG. 4) having a first plate 64 and a second plate 62. As shown in this view, one or both of the first and second plates 62 and 64 forming the second flow path are curved unlike the flow path for the feedstock material of FIG. 2. The curvature may be imparted for any desired effect such as to compensate for other effects that might intend to make the drops from the end of the sheets smaller or larger. Since the thickness of the feedstock is a factor in the size of the drops, the curved flow path can be used to compensate for these other effects or create new effects of its own.

Figure 8:
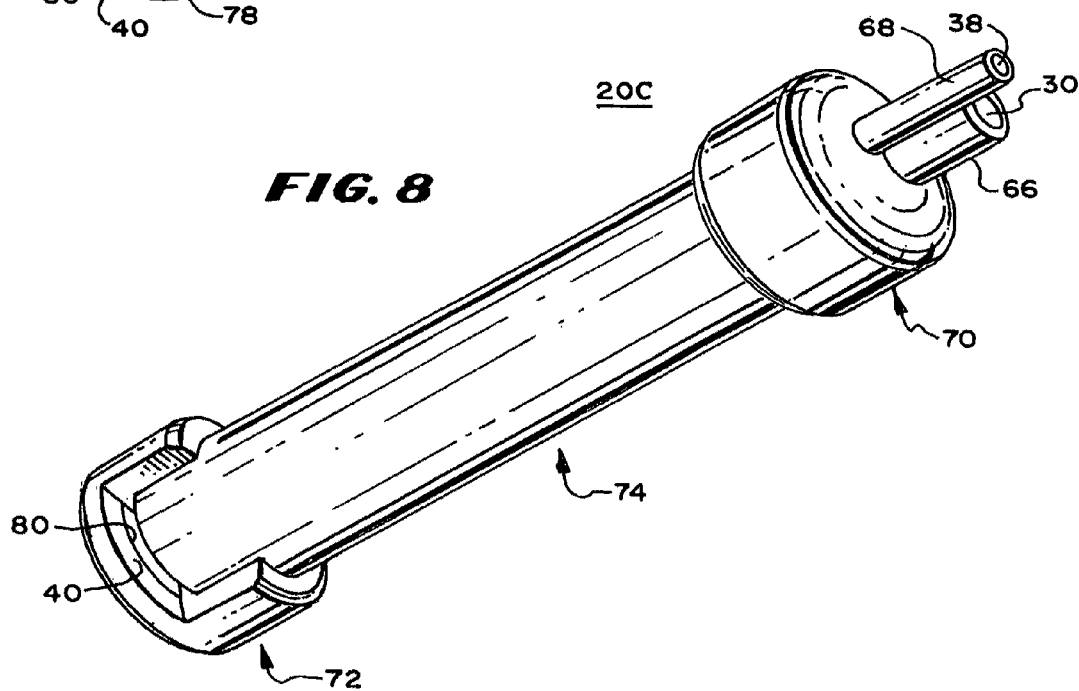
FIG. 8 is a perspective view of another embodiment of spray apparatus in accordance with an embodiment of the invention.
Figure 9:
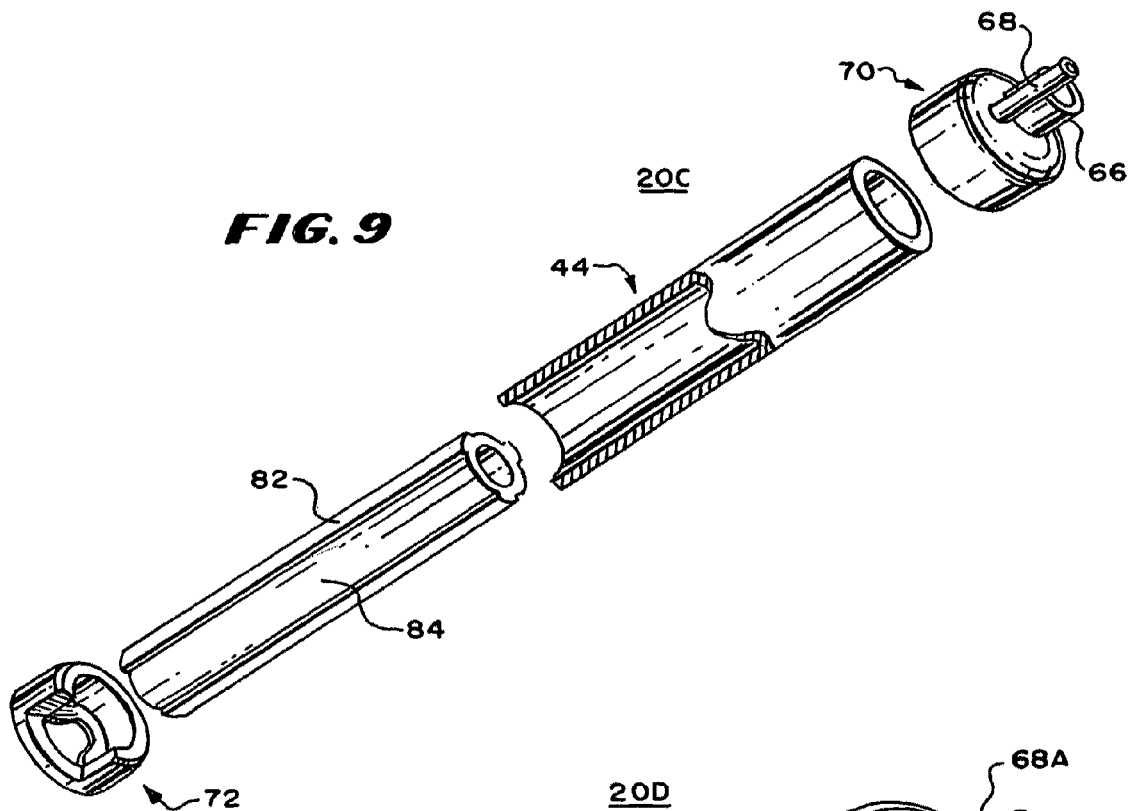
FIG. 9 is a partly exploded view of the embodiment of FIG. 8.

In FIGS. 7, 8 and 9, there is shown three perspective views of a fixture 20C in with its parts in three different positions with respect to each other to illustrate its construction of the fixture. The fixture 20C as best shown in FIG. 7, includes an inlet end cap 70, an outer cylinder 74, and an outlet end cap 72. The inlet end cap 70 includes a kinetic energy fluid inlet port 66 and a feedstock material inlet port 68 for receiving the kinetic energy fluid 30 and the feedstock material 38 respectively. It is positioned on one side of the outer cylinder 74 with the outlet end cap 72 being positioned on the other side. The outlet end cap 72 includes the impact surface 40 formed on the inner bottom of the outlet cap 72 and having a cylinder end rest 76 extending approximately 40 degrees around the outer circumference of the end cap 72 to receive the outer cylinder 74 and an inner cylinder (not shown in FIG. 7) to restrict the area through which the feedstock material and kinetic energy fluid flow. A center portion which is recessed as shown at 78 forms a kinetic energy fluid impact area and an outer circumferential area 80 provides an impact area for a thin wall of feedstock material and the outlet of the fixture 20C so that the air impacts at 78 and flows circumferentially outwardly to impact a thin circumferential rim of feedstock material. The circumferential arc at the outer edge of the impact area 80 for the feedstock material determines the angle of the spray and can be adjusted by rotating the inner cylinders with respect to the outlet in a manner to be described hereinafter.

In FIG. 8, there is shown another perspective view of the fixture 20C also showing an inner cylinder 78 that is within the outer cylinder 74 with the inner cylinder being lowered against the surface 78 to permit the flow of the kinetic energy fluid through the inner tube 30 against the impact surface 78 from which it flows outwardly to contact the feedstock material impact surface 80 and force it outwardly. The kinetic energy fluid which in the preferred embodiment is air at a relatively low pressure between zero and ten psi and move commonly in the range of one to three psi is intended to develop droplets in a viscous material or a Newtonian fluid with a defined size distribution and adequate size for contact with plants and to avoid spray drift.

In FIG. 9, there is shown still another perspective view of the fixture 20C with the outer cylinder withdrawn exposing a larger section of the inner cylinder 80 having a recessed longitudinal extending portion 82 and showing the outer cylindrical surface of the inner cylinder 80 against the inner surface of the outer cylinder 74 so that the longitudinal recessed portion 82 provides a curved narrow path for the flow of feedstock material, thus providing a relatively narrowed curved edge against which the kinetic energy fluid flows to spray Newtonian fluid, a viscous feedstock material or suspended particle. Because the inner cylinder is rotatable with an end cap, this recessed portion may be aligned with or misaligned with the impact surfaces 78 and 80, thus controlling the circumferential number of degrees of the spray.

Figure 10:
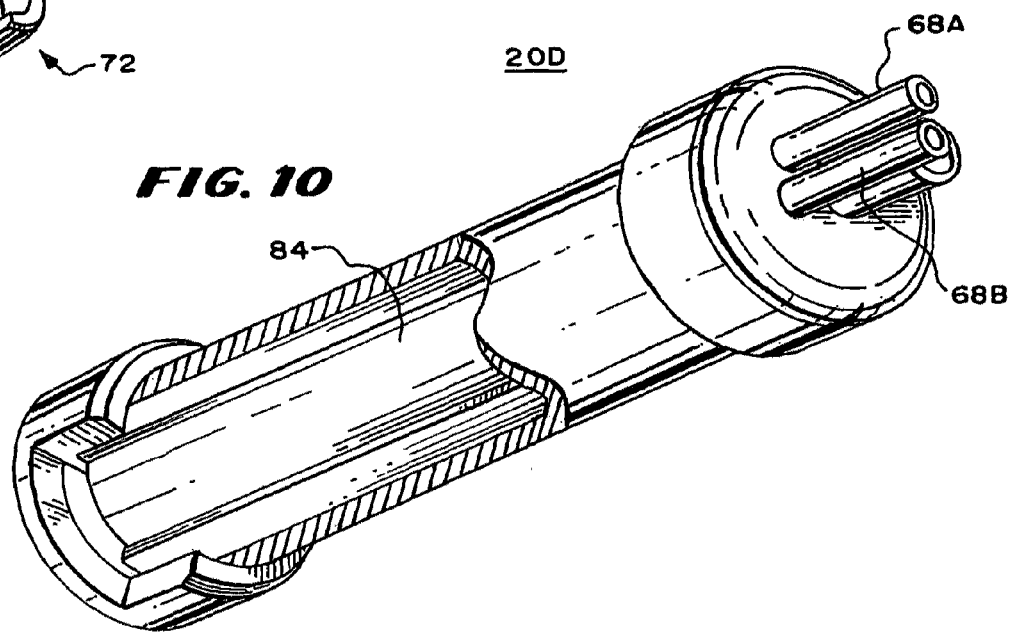
FIG. 10 is a partly broken away perspective view of still another embodiment of spray apparatus in accordance with an embodiment of the invention.
Figure 28:
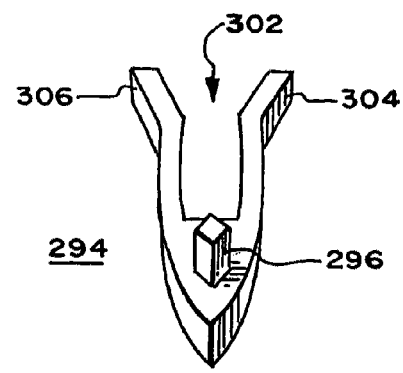
FIG. 28 is second perspective view of the planting shoe of FIG. 27.
Figure 29:
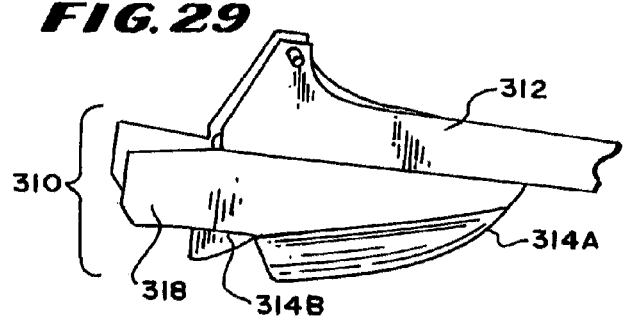
FIG. 29 is a perspective view of another embodiment of the planting shoe in accordance with an embodiment of the invention, usable primarily with the embodiments of the planters of FIGS. 26 and 27.
Figure 30:
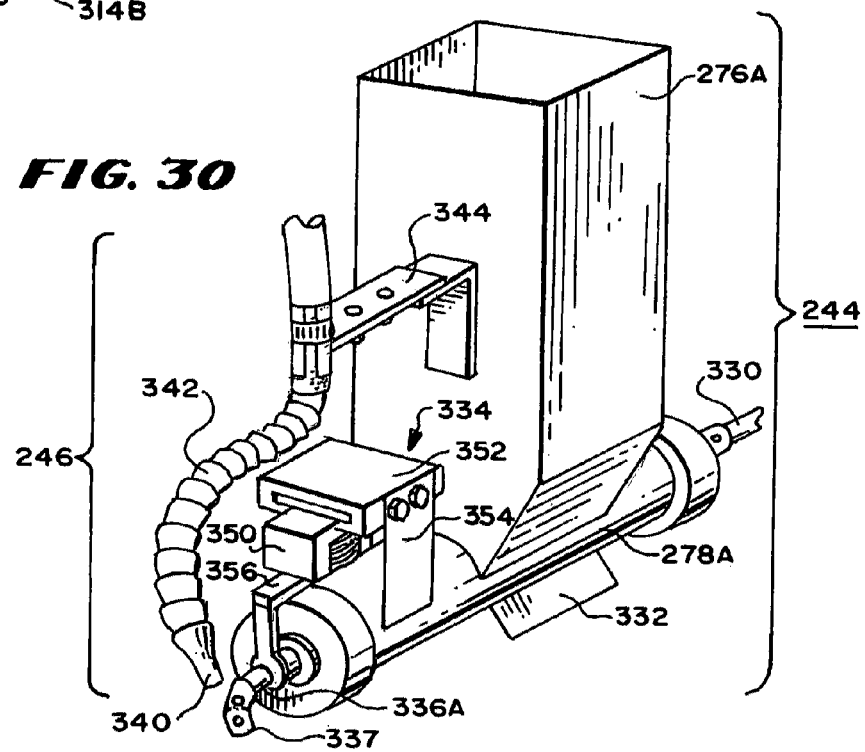
FIG. 30 is a perspective view of an embodiment of a small seed feeder usable with the planters of FIGS. 23 and 24.

In FIG. 10, there is shown still another perspective view of a fixture 20D which is similar in every respect to the fixture 20C of FIGS. 7-9 but has a recessed portion 84 which, instead of receiving feedstock material from one feedstock inlet indicated at 68 in FIGS. 28-30, may receive either or both of two feedstock materials through inlets 68A and 68B. Thus, it may mix inlets for dilution purposes or receive a choice of more than one feedstock from multiple inlets that are controlled by a valve or fed by multiple pump channels from a three position valve (one position can be used to purge with water).

In FIG. 11, there is shown a schematic block diagram of an apparatus 90 for utilizing the spray systems such as the spray system 20C including a spray vehicle 92, which supports and carries at least a storage vessel 94, a pump 96 and booms or other fixture holders. In this specification, "spray vehicle" means any means of transporting a feedstock material for application to agricultural land whether it be a land vehicle, boat or an airplane and whether the spray vehicle is intended to spray a fluid such as for example a pesticide or intended to plant seeds. Commonly, the spray vehicle 22 may be a small vehicle such as would otherwise be used as a recreational vehicle or a golf cart or the like, or may be larger vehicles such as pick-up trucks or still larger especially made heavy equipment intended for carrying agricultural input chemicals.

The storage vessel 94 which typically will be a tanks or the like may contain a agricultural input material. Commonly, this material is viscous in its original form, and unlike the prior art, is sprayed in viscous form although it may be slightly diluted. With the fixture 20C, viscous materials can be effectively sprayed and sprayed with droplet sizes that are particularly effective for foliar reception, or on the other hand, finer droplets that might be spread closer to the ground. Moreover, the spray vehicle can be a planter and the sprayed materials may be a very viscous material with randomly located seeds or other particles.

For example, a particularly effective herbicide, glyphosate, is generally diluted to a large heavy volume before spraying to reduce its viscosity and provide a carrier volume because the prevalent agricultural sprayers cannot effectively spray low volume or high viscosity herbicides. Glyphosate is sold by Monsanto Company, 800 North Lindbergh Boulevard, St. Louis, Mo. 63167 U.S.A. under the trademark, Roundup. This invention effectively sprays glyphosate at a rate of 4 quarts of total liquid per acre rather than the 10 required for conventional sprayers.

The equipment is also capable of spraying powders which may be utilized in some applications. In some applications the fixture 20C includes means for applying a charge to the drops so as to direct them better to the plants. This device may take many of the forms known in the art such as for example passing the drops through an electric field.

A pump 96 will generally be a low pressure low-volume positive-displacement pump, pumping fluid to the fixture with zero pressure at the fixture. Because the invention does not require liquid pressure for atomization, high pressure pumps are not needed and leakage problems are avoided. In the preferred embodiment, it is a gear pump. In the preferred embodiment, it will be blowing approximately five or less psi of a compatibly-selected kinetic energy fluid against a viscous or other fluid within the fixtures 20C. The fixtures 20C will commonly be mounted to spray booms as known in the art. The spray booms 98 will be mounted on the spray vehicle to provide coverage over a large area with a plurality of appropriately spaced fixtures along the boom.

In one embodiment, the spray from the fixtures passes between two charged plates 23 supplied by a power supply 21. A single power supply can provide potential to several combinations of plates in parallel. The plates induce a charge onto the drops leaving the fixtures and this charge has been found to improve the contact of the drops with leaves under some circumstances.

In FIG. 12, there is schematic block diagram of a planting system 100 having a planter 102, a storage vessel 104 for semisolids in which particles are suspended for distribution, a semisolid transfer mechanism 106, such as a auger and a fixture 20C. In this embodiment, relatively small seeds are suspended in the a storage vessel 104 for seed suspension materials 104. In this specification, "seed suspension materials" means a medium that is capable of keeping particles suspended for an extended period of time rather than permitting them to settle. In this specification, the langage "in suspension" when referring to seeds or other solid particles means that the seeds or other particles are being held spaced from each other distributed through a medium without settling for the amount of time needed for planting seeds. This time may be a day or longer so that a farmer may use fluid drilling until a tank is used up without needing to mix the seeds again because they have settled from the original mixing. The medium may be mainly a gel, or semisolid, or colloid, or very viscous material. There is enough high density material including particles within the seed suspension materials to exert force on solid seeds and move them together with the semisolid rather than causing the semisolid to flow around them when shear plate force is applied. This combination permits seeds to be randomly mixed and randomly distributed in the seed suspension materials to be moved by an auger and eventually dispersed through the fixture 20C. The auger has pitch angles on the screw graduated from low angles at the inlet to facilitate feeding the seed gel mixture to higher angles in the delivery tube section to give a friction pumping surface to move the gel seed mix. The screw in effect provides a shear plate motive force for delivering the seed particles and the fluid while at the same time providing a moving delivery tube wall to dislodge any seed pile ups and further, it effectively singulates seeds into the delivery tube.

In FIG. 13, there is shown another planter system with the same planter 102 which may for example be a spray vehicle with a means for forming a trough and distribution of seeds in the trough, a storage vessel for seed suspension materials and semisolid transfer mechanism 106. However, instead of the fixture 20C, the seed suspension materials at the end of the auger is simply removed by a seed knife which may be an air burst or a solid member that scrapes the material into the trough.

In FIG. 14, there is shown a flow diagram of a planting process 120 including the step 122 of forming a fluidic continuous medium capable of suspending seeds and moving the seeds with the continuous medium, the step 124 of mixing the seeds in the continuous medium to form fluidic semi-solid with randomly dispersed seeds within and the step 126 of distributing the fluidic semi-solid with randomly dispersed seeds within it on an agricultural field. In this process, the fluidic continuous medium may be a material of sufficient density or a collidal suspension having a density and viscosity that is sufficient so that the seeds will be extremely slow in settling. The seeds should be supported without settling significantly more than 10 percent and preferably less than 5 percent in the period of time between mixing the seeds in the medium and planting. Normally, this time will be less than a 24 hour period since commonly the farmer will mix the seeds and medium in the same 24 hour time period as he plants. To obtain adequate mixing, the seeds should have force directly applied to them. This can be accomplished by mixing into the medium a sufficient amount of solid particles so that there is contact through the solid particles and the moving surfaces applying force for mixing.

In the preferred embodiment, this mixture is moved by an auger to a furrow for planting and sections of it as appropriate for the number of seeds are removed from the end of the auger into the furrow or broadcast onto the subject field using a spray fixture designed to spread the seeds over a broad pattern. This can be done with a substantially conventional or specially modified planter. The auger will be synchronized normally with the speed of the planter which may be received from the wheel speed or any other proportional area. The total acreage being utilized may be measured by a conventional global positioning system for purposes of monitoring the amount of seed being dispersed and, under some circumstances, for accounting purposes such as billing or the like. In this specification, a fluidic continuous medium capable of suspending seeds and moving the seeds with the continuous medium while the seeds remain randomly distributed will be called a "seed-supporting medium".

In FIG. 15, there is shown a flow diagram of a process for fluid drilling, including the step 132 of preparing a seed supporting medium and incorporating beneficial inputs with seeds, the step 134 of mixing seeds in the seed supporting medium to form fluidic semi-solid with randomly dispersed seeds within it and the step 136 of distributing the fluidic semi-solid with randomly dispersed seeds within it on an agricultural field. The beneficial inputs may be bio-chemicals or beneficial microorganisms which can be sustained on the seed surface or in the hydrated seeds and facilitated by the appropriate seed supporting medium.

In FIG. 16, there is shown a flow diagram of a process 140 for forming fibers comprising the step 142 of forming a liquid containing the substance to be formed into fibers or powders, the step 144 of causing movement of individual streams of the liquid into a working zone, the step 146 of stretching the streams into fibers of the desired length with at least one energy field and the step 148 of drying and collecting the fibers or the alternate steps 147 and 149 of forming particles such as powder and drying and collecting the particles. Some materials are difficult to put into a form which can be further formed into small fibers. For example silica and chitosan and many metals are useful if they are put into a nano-fiber form but it is difficult to get them into a liquid form and then use prior art processes to form nano-fibers. In this invention, once the desired substances are put into a liquid, they can be moved as indicated by the step 144 into a working zone by the apparatus of FIG. 3. While in the working zone, streams of the liquid can be stretched to the desired diameter using an energy field or two energy fields. For example the apparatus of FIG. 3 provides a kinetic energy fluid as one field and another kinetic energy fluid as another field which stretches the streams because they are moving at different velocities, one on one side of the stream and the other on another side. When the streams are at the right desired diameter, they are dried and can be collected by known processes such as electrospinning as shown in step 148.

In FIG. 17, there is shown a process 150 for forming one important material, chitosan, into a liquid state so as to form chitosan fibers or powders which are useful for many purposes. For example chitosan fibers can be used in many pharmaceutical applications such as drug delivery and controlled release and in medical technology such as wound and burn dressings or surgical treatment, dermatitis and fungal infections, contact lens, bacteriostat and fungistat and bone disease, biotechnology applications such as membranes, biocatalysts, enzyme immobilization, protein separation, cell immobilization, food products, preservatives, fat absorption animal feed additives, metal-chelating processes such as absorption of transition metal ions such as copper, chromium, lead, silver and so on, agricultural products such as timed-release, seed coating, foliar application and paper products. There are difficulties in forming a liquid containing chitosan that would be suitable for the making of fibers. One difficulty is that most known solutions are more conductive than desirable and have a higher viscosity than desirable for the prior art methods of forming fibers. An improved method of putting chitosan into a liquid state as shown in FIG. 17.

In FIG. 17 there is shown an improved process for putting chitosan into a liquid state suitable for the forming of fibers, thin films, mats or powders having the step 152 of dissolving chitosan powder in a water and an acidic solution such as a glacial acidic acid solution, the step of 154 of bubbling carbon dioxide through the chitosan solution, the step 156 of adding an organic solvent while continuing to bubble carbon dioxide through the solution until it is suitable for forming fibers or the step 157 of adding a surfactant while continuing to bubble carbon dioxide through the solution until the solution is suitable for forming powder. While it is known that acetic acid can be displaced by bubbling carbon dioxide through the acetic acid solution, this has not been applied to chitosan solutions. While carbonic acid ($11_2CO_3$, on $CO_2$ solubilization) has a lower pK than acetic acid, it is mere mass action imposed by continuous feeding of the former that facilitates removal of the organic acid from the aqueous environment. The use of $CO_2$ instead of an inert gas has the synergistic effect of stabilizing a pH below 5, which is critical to maintaining chitosan in solution. However, the $CO_2$ bubbling by itself leads to chitosan precipitation by saturation as the water and acid is removed. This problem is avoided by adding solvent. Superior results in avoiding precipitation of chitosan have been obtained by replacing the lost ingredients with ethanol, thus synergistically lowering the surface tension of the solution, which is required for making fibers. If an alcohol is added without bubbling carbon dioxide through the solution, the solution may form a gel with only the addition of small amount of alcohol.

The chitosan-water-$CO_2$-ethanol solution is difficult to spin in this form. However, it has been found that addition of as little as 2.5 wt. % poly(ethylene oxide) (PEO) is sufficient to markedly improve fiber formation using prior art spinning techniques with temperature and voltage control and the addition of surfactant improves the formation of powders. However, the fiber lengths obtainable even with this formulation using the prior art electrospinning techniques are relatively short compared to the fiber lengths obtainable with the fiber forming techniques of this invention using two kinetic energy fluids on different sides of a compatibly-selected feedstock material. The use of the two kinetic energy fluids on different sides of a compatibly-selected feedstock material also permits the formation of satisfactory fibers without electrospinning and the formation of longer fibers using the above solution and electrospinning Evaporation of a small amount of ethanol during the time-of-flight of the charged liquid filaments from the delivery capillary to the collector electrode is all it takes to induce solidification. Interestingly, while the dominant chitosan weight fraction in the fibers is insoluble in water, washing the fibrous deposits with de-ionized water lowers the PEO content below its starting value of 2.5%.

More specifically, in one embodiment, solutions of chitosan requiring very small amounts of plasticizers such as poly (ethylene) oxide, or no addition of plasticizer agents at all, are prepared by dissolution of chitosan in carboxylic or mineral acid aqueous solutions, followed by total or partial displacement of the acid with carbon dioxide bubbling, and addition of controlled amounts of ethanol. With the aid of electrohydrodynamic processing of the solution formulation fibers and particles with apparent diameters in the micron and submicron range are produced. The chitosan solution formulation also affords processing into thin films, given its lower surface tension than other formulations based on water and carboxylic and/or mineral acids.

Figure 18:
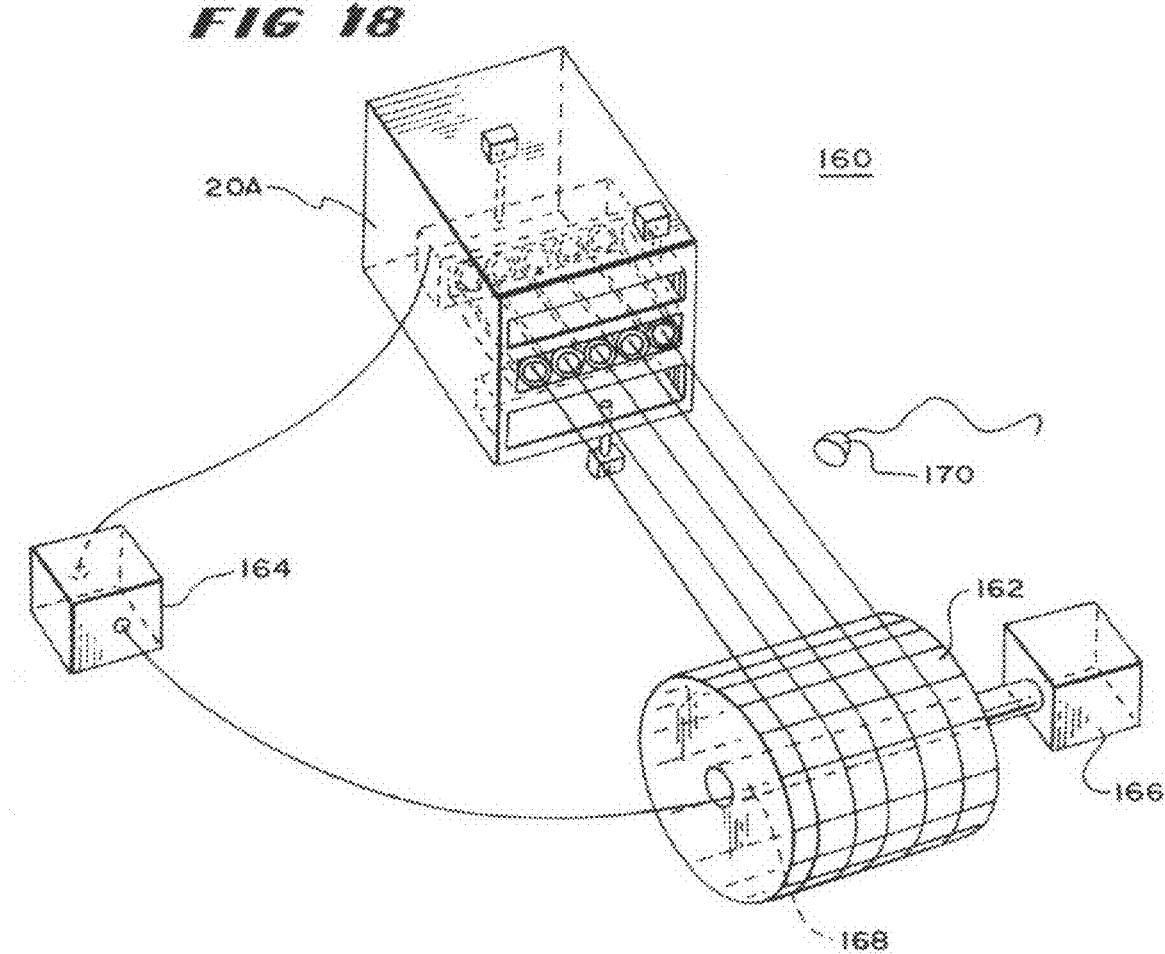
FIG. 18 is a simplified perspective drawing of a system for forming fibers in accordance with an embodiment of the invention.

In FIG. 18, there is shown a process 160 of forming continuous fibers having a fixture 20A, a collector 162, a source of high potential 164, and a motor 166 for driving the collector 162. The fixture 20A receives two kinetic energy fluids through the regulators 75 and 77 to contact the feedstock material and an impact area 80. The feedstock material is being extruded from needle openings 50A-50E onto the collector 162 which is rotated by the motor 166 while a high potential electrical difference is applied between the needles 50A-50E and the collector 162 to further stretch and draw the fibers. In the preferred embodiment, the fibers are drawn into nano fibers. The feedstock material leaving the needles 50A-50D is fed at a rate between and 2 and 7 micrometers per minute through the regulator 75.

The collector and the needles 50A and 50E is spaced five to ten inches apart and the gradient is approximately 4 to 600 volts per centimeter. Without the potential applied, oriented nano fibers can be produced. With the potential applied, a mat is obtained consisting of micrometer diameter fibers parallel to each other in length between each other by nano fibers forming a tissue like mat of considerable strength with the ability of having good cell adhesion to be useful in many biomedical applications. Variations in viscosity and potential can result in electro spray of fine particles when it is desired to make nano particles.

Figure 19:
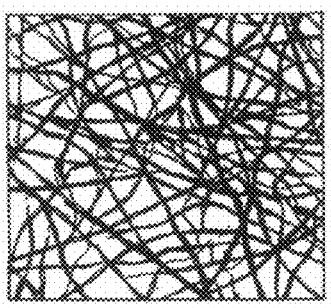
FIG. 19 is an SEM of a non-oriented fiber membrane made in accordance with an embodiment of the invention.
Figure 21:
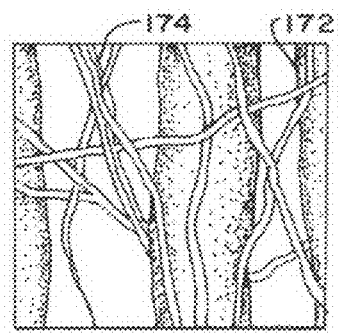
FIG. 21 is an SEM of non-oriented fiber mat in accordance with an embodiment of the invention.

In FIG. 19, there is shown an SEM of non-oriented chitosan fibers drawn with a potential gradient of between 4 and 600 volts per centimeter to a stationary collector to form a thin film or paper. With slow rotation, a mat is formed such as the mat shown in FIG. 21. In FIG. 21 there is shown an SEM of a mat including chitosan fibers 172 in the micrometer diameter range (between 0.5 and 1.5) and chitosan fibers 174 in the nanometer range with micrometer fibers 172 cross-linked with the nanometer range fibers 174. The flow rates were generally between 0.5 and 1 milliliter per hour with the distance between electrodes being approximately 11 centimeters to 30 centimeters.

Figure 20:
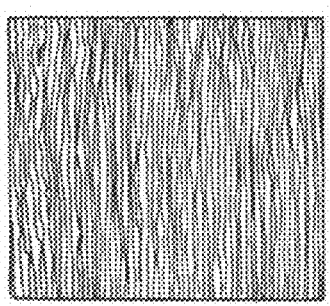
FIG. 20 is an SEM of an oriented fiber membrane in accordance with an embodiment of the invention.

In FIG. 20, there are shown oriented fibers (longitudinal axis parallel to each other) that are obtained by more rapid rotation and a higher potential gradient. The limit on the potential gradient is related to arcing between the fibers and can be increased with spatial increases between fibers at the price of having fewer fibers per square inch in a final matted product. The chitosan mats and fibers are obtained without salt in the feedstock material. The solution obtained has a viscosity of between 3 centipoise (cP) and 800 centipoise. With 3.16 centipoise at 15.8 percent torque, there is a surface tension of 46.7 dynes and at 716 centipoise at 23.9 percent torque, the surface tension is 36.3 dynes. The needle orifices 50A-50E are generally 20 gauge.

The flow rates used to obtain the fibers of FIGS. 19-21 from the apparatus of FIG. 18 are in the nano-micro liter per hour range, and an electrical potential difference is applied between the needle and a collector electrode surface, preferably located several inches away from the liquid delivery point. Depending on key physical properties of the solution being subjected to EHD (e.g., viscosity, surface tension, and conductivity), on partial or total solvent evaporation dissolved matter can lead to either particles (electrospray) or fibers (electrospinning).

Figure 22:
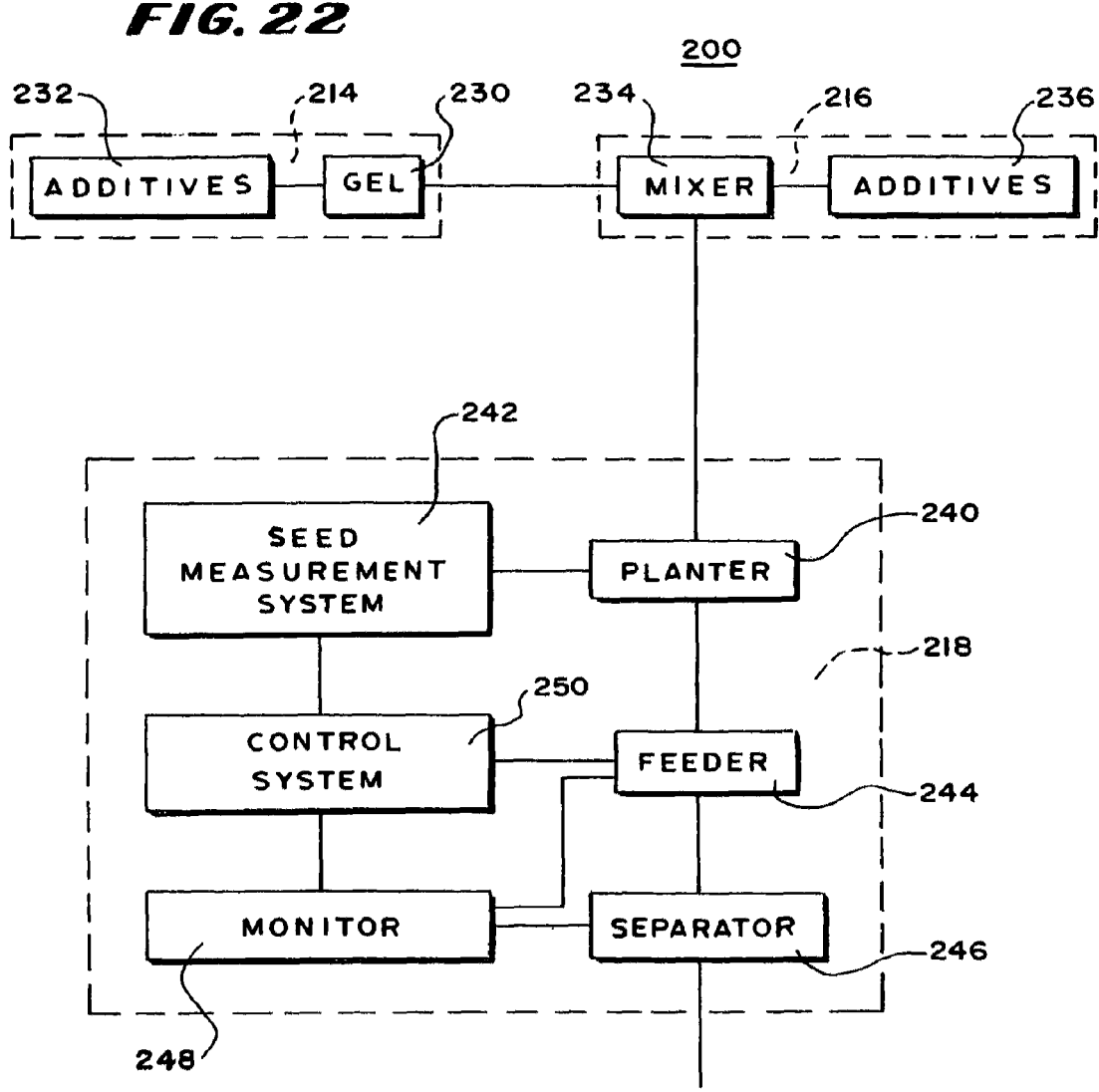
FIG. 22 is a block diagram of a planting system in accordance with an embodiment of the invention.

A very small amount of polyethylene oxide (PEG) is added as plasticizer to facilitate fiber formation on electrospinning. Dissolved carbon dioxide keeps the pH of the solution low enough to avoid chitosan precipitation. By doping the solution with small amounts of PEG, fiber diameter can be bimodal, with the aligned large-diameter (dominant) fibers having an average diameter of 5 μm, and the cross-linking filaments having an average diameter of about 100 nm, as shown in FIG. 22. On deposition of an electrically charged fiber, a simple and rapid discharge mechanism consists of establishing such peculiar multiple points of contact with adjacent, or sub-layer fibers. The generation of such extremely thin inter-fiber filaments cannot occur between two discharged, gelatinous fiber strands in light of surface tension arguments.

The oriented fiber structure looks like a membrane with average pore diameter around 10 μm. Oriented fiber mats constitute an advance over conventional membranes or fibers since anisotropic mechanical properties are key for certain applications such as cartilage engineering. The fibers emanate in a solvent-swollen state since drying of the mats with a heat gun led to a ten-fold diameter decrease (not shown). The diameter of the fibers, besides being a function of the physical properties of the solutions, depends strongly on the concentration of PEO

EXAMPLES

While many other values of the variables in the following examples can be selected from this description with predictable results, the following non-limiting examples illustrate the inventions:

General Procedure

Solutions of chitosan in acetic acid/water/alcohol were bubbled with pure carbon dioxide gas at atmospheric pressure, and ethanol, methanol or acetone—depending on the co-solvent originally chosen—was added to prevent dryness.

Example 1

Formation of CO$_2$-EtOH-Chitosan Solution

Procedure:

A suspension of chitosan powder (log, Aldrich DA=80.6%) in 300 mi of distilled water was magnetically stirred. a 1 percent Glacial acetic acid (9.53 mL, EM Science, 99.9%) was then added to dissolve the suspended chitosan. After that, ethanol (Pharmco, 200 proof) was added slowly to the solution Result:

A few drops of the 1% chitosan/acetic acid solution in ethanol, are enough to yield precipitates and/or for a gel,

Example 2

Formation of CO$_2$-EtOH-Chitosan Solution

Procedure:

A suspension of chitosan powder (log, Aldrich DA=80.6%) in 300 mi of distilled water was magnetically stirred. Glacial acetic acid (9.53 mL, EM Science, 99.9%) was then added to dissolve the suspended chitosan. The resulting solution was bubbled with carbon dioxide (Linweld, industrial grade) for 30 min. After that, ethanol (Pharmco, 200 proof) was added slowly to the solution while stirring and bubbling CO$_2$ until total solution reached a volume of H L.

Result:

A clear chitosan solution was produced with no precipitates.

Example 3

Formation of CO$_2$-MeOH-Chitosan Solution

Procedure:

A suspension of chitosan powder (Vanson, DA=83.3%), in 300 mi of distilled water was magnetically stirred. a 1 percent Glacial acetic acid (9.53 mL, EM Science, 99.9%) was then added to dissolve the suspended chitosan. After that, methanol was added slowly to the solution.

Result:

A few drops of the 1% chitosan/acetic acid solution in methanol are enough to yield precipitates.

Example 4

Formation of CO$_2$-MeOH-Chitosan

Procedure:

A suspension of chitosan powder (Vanson, DA 83.3%), in 300 mi of distilled water was magnetically stirred. Glacial acetic acid (9.53 mL, EM Science, 99.9%) was then added to dissolve the suspended chitosan. The resulting solution was bubbled with carbon dioxide (Linweld, industrial grade) for 30 min. After that, methanol was added slowly to the solution while stirring and bubbling CO$_2$ until total solution reached a volume of H L.

Result:

A clear chitosan solution was produced with no precipitates.

Example 5

Formation of CO$_2$-Ac-Chitosan. Solution

Procedure:

Seven g chitosan (Vanson, 83.3%) was stirred in the solution of 315 ml distilled water and 65 ml acetone (EM Science, 99.5%). Adding 6.67 ml glacial acetic acid allowed dissolution of chitosan on stirring. After that, acetone was added at a rate of 200 ml/h until the total volume of the solution reached 700 ml.

Result:

A few drops of the 1% chitosan/acetic acid solution in acetone, are enough to yield precipitates,

Example 6

Formation of CO$_2$-Ac-Chitosan Solution

Procedure:

Seven g chitosan (Vanson, 83.3%) was stirred in the solution of 315 ml distilled water and 65 ml acetone (EM Science, 99.5%). Adding 6.67 ml glacial acetic acid allowed dissolution of chitosan on stirring. The resulting solution was bubbled with CO$_2$ for 30 min. After that, acetone was added at a rate of 200 ml/h until the total volume of the solution reached 700 ml. This solution was called CO$_2$-Ac-chitosan.

Result:

A clear chitosan solution was produced with no precipitates.

Tables 1 and two below summarize the results of the examples. Table 1 shows the conductivity and surface tension of chitosan solution prepared as in examples 1, 3 and 5 and table 2 shows the conductivity, surface tension viscosity and pH of chitosan solution prepared as in examples 2, 4 and 6. It appears from these table that CO$_2$ bubbling significantly improves the characteristics of chitosan solution that aid in electrospinning.

In FIG. 22, there is shown a block diagram of a planting system 200 having a seed carrier system 214, a seed and carrier mixing system 216 and a controlled fluid drilling system 218. After the appropriate seeds are prepared by initiating germination or priming or otherwise treating the seeds such as for example as described in U.S. Pat. No. 5,628,144 granted to John A. Eastin on May 13, 1997 or U.S. Pat. No. 6,646,181 granted to John Eastin on Nov. 11, 2003 or U.S. Pat. No. 6,076,301 granted to John Eastin on Jun. 20, 2000 or U.S. Pat. No. 5,910,050 granted to John Eastin on Jun. 8, 1999 or U.S. Pat. No. 5,974,734 granted to John Eastin on Nov. 2, 1999 or U.S. Pat. No. 5,628,144 granted to John Eastin on May 13, 1997, they are applied to the seed and carrier mixing system 216 where they are mixed with the seed carrier from the seed carrier system 214 to form a matrix of seeds suspended in carrier. This matrix is applied to the controlled fluid drilling system 218 for planting in the field.

TABLE 1

Conductivity and pH of solution containing 1% acetic acid in different solvents.

| Solvent | Conductivity (μS/cm) | pH |
|---|---|---|
| Water | 645 | 2.84 |
| 70% EtOH, 29% water | 22.3 | 3.87 |
| 70% EtOH, 29% water after bubbling CO$_2$ | 22.1 | 3.93 |
| 70% EtOH, 29% water with bubbling CO$_2$ | 21.0 | 3.95 |

TABLE 2

Conductivity and surface tension of 1% chitosan in 1% acetic acid in different aqueous organic solvents after carbon dioxide bubbling.

| solvent | Conductivity (µS/cm) | Surface tension (dymes/cm) | Viscosity (cP) | pH |
|---|---|---|---|---|
| Water (pure) | 2180 | 63 | 93.9 @31.3% | 4.14 |
| 70% EtOH | 216 | 31.8 | 53.7 @17.9% | 5.26 |
| 70% MeOH | 695 | 32.1 | 65.4 @21.8% | 5.44 |
| 55% Acetone | 715 | 35 | 53.7 @17.9% | 5.33 |

In one embodiment of the planting system 200, imbibition is done prior to mixing the seed into the gel but only until activation of the seed and prior to the stage of growth. It may then be: (1) returned to the water content it had before priming; (2) stored, and later; (3) added to the carrier, which may be a conventional gel for fluid drilling. The germination process continues through the activation and growth stages in the gel and/or in the soil after planting. The time it remains in the gel must be relatively short in terms of days such as less than four days although it differs from seed to seed. Preferably, the seeds are planted within six hours of mixing them into the gel. The process is suitable if no more than 20 percent of the seeds are more than 30 percent into the activation stage prior to the removal of water. The activation stage is considered to be from the start of metabolic action in the seed before growth until the start of growth and the above percentages are percentage of time of the activation stage.

In addition to priming several other treatments can be performed on the seeds prior to mixing them with the gel, such as for example: (1) germination may be started: (2) beneficial microorganisms may be added to inoculate the seeds during priming or the microorganisms may be added to the gel; (3) the seeds may have genes introduced by synchronizing the stage of development of the plant during priming at a stage that includes large amounts of 4C DNA and transfecting cells of the seed; (4) damaged seeds can be removed by sorting out larger seeds after soaking the seeds to cause the damaged seeds to swell or permitting matrix material to adhere to the seed during priming to make a larger cluster; and/or (5) systemic resistance to disease can be induced by introducing desired agents during priming or in the fluid.

The planter separates the seeds with a small amount of gel around each of them and plants them in furrows or broadcast spaces them on the ground as needed. The amount of gel is considerably less than in prior art fluid drilling systems. The pre-emergence time of seeds planted by this method is relatively close such as, for example, 80 percent of some plants emerge within one week of each other in contrast to 20 percent by some prior art fluid drilling processes. At least 50 percent should emerge within two weeks of one another in accordance with this invention. The seed carrier system 214 includes a suitable gel 30 and, under some circumstances, additives 32 which are mixed into the gel. The additives 32 may be microorganisms or pesticides or growth hormones, or fertilizers useful in planting which are intended to innoculate, enter and simulate or protect the seed and seedling.

The gel may be conventional and has a volume: (1) for large seeds such as those of corn, preferable approximately equal to the volume of the seeds but always between half the volume of the seeds and four times the volume of the seeds; and (2) for small vegetable seeds such as cabbage, preferably twice the volume of the seeds and always between the same volume as the seeds and less than ten times the volume of the seeds.

The gel must have a viscosity and mobility: (1) sufficiently high to maintain the seeds in suspension so that they will not drop a greater distance than the depth of a groove of an auger used in the feeder within the time it takes for the screw to make one evolution; (2) sufficiently low to fill each groove at least half way as the screw turns; (3) sufficiently low to be released at the end of the nozzle with a difference in air pressure as low as one pound per square inch across the nozzle tip; and (4) with sufficient high density particles to enable mixing of the seeds by forces applied to the gel seed mixture, particle or seed.

Generally, many suitable gels are known and may be used in the densities prescribed. For example, hydroxyethylcellulose sold by Hercules, Inc., 910 Market Street, Wilmington, Del. 19899, under the trademark "NATROSOL" may be used mixed in the recommended proportions. This gel has been shown to be capable of supporting microorganisms in fluid planting. This particular gel, although not the only one available, is described in Bulletin 250-11 revision 10-80, 10M07640H entitled NATROSOL printed by Hercules, Inc. at the aforementioned address, and its use in mixing is similarly described in other fliers produced by that company.

The viscosity may be measured using a viscometer such as the Brookfield viscometer and should be in the range of 1,800 to 4,000 centipoises, and generally: (1) for small seeds such as cabbage seeds, it is in the range of 1,800 to 2,000 centipoises; (2) for medium sized seeds, it is in the range of 2,500 to 3,000 centipoises; and (3) for large seeds such as corn, it is in the range of 3,000 to 4,000 centipoises. However, the exact viscosity can be determined easily by trial and error in the operation of the feeder.

The seed and carrier mixing system 216 includes a mixer 34 and additives 36. The mixing may be done by hand or by an automatic mixer which receives the seeds and the gel and mixes them together thoroughly. Additives such as microorganisms, pesticides, fertilizers or growth hormones may be added at this stage if they have not been added at a prior stage. The seeds and gel should be sufficiently mixed to leave the seeds in suspension and may be done in large quantities and then suitably poured into the holder, tank or hopper for the feeder or may be mixed in the hopper for the feeder. If they are added to the hopper by a hose from a larger mixer, care must be taken so that laminar flow does not remove the seeds from suspension or the mixing must be repeated in the hopper. Generally, if poured into the hoppers in large quantities, the suspension is not to be disturbed.

The controlled fluid drilling system 218 includes a planter, a speed measurement system for the planter 242, a feeder 244, for feeding the combination of gel and seeds and a separator 246 for separating the seeds, a monitor for the seeds 248 and a control system 50. The planter 240 may be a conventional planter pulled by a primary vehicle such as a tractor and for opening furrows in the ground and to permit seeds to be inserted into them and for closing the furrows. The feeder 244 and separator 246 are mounted on the planter 240 to feed gel and seed to the furrow and separate seeds. The feeder 244 is monitored by the monitor 248. A control system 50 may be used to compare the speed of the tractor with the feeding of seeds and adjust the feeder 244 to maintain the proper orientation. In one embodiment, the speed of operation of the feeder 244 is measured rather than the actual seeds being dispersed and this is correlated with the number of seeds in accordance with the seed density of the gel. This is done automatically by conventional planter equipment which drive the gel feeder in this invention but are known for driving seed drilling equipment. Also, a monitor 248 is visible to the operator who can adjust either the speed of the primary mover pulling the planter 240 or the speed of the feeder 244 in other embodiments.

Figure 23:
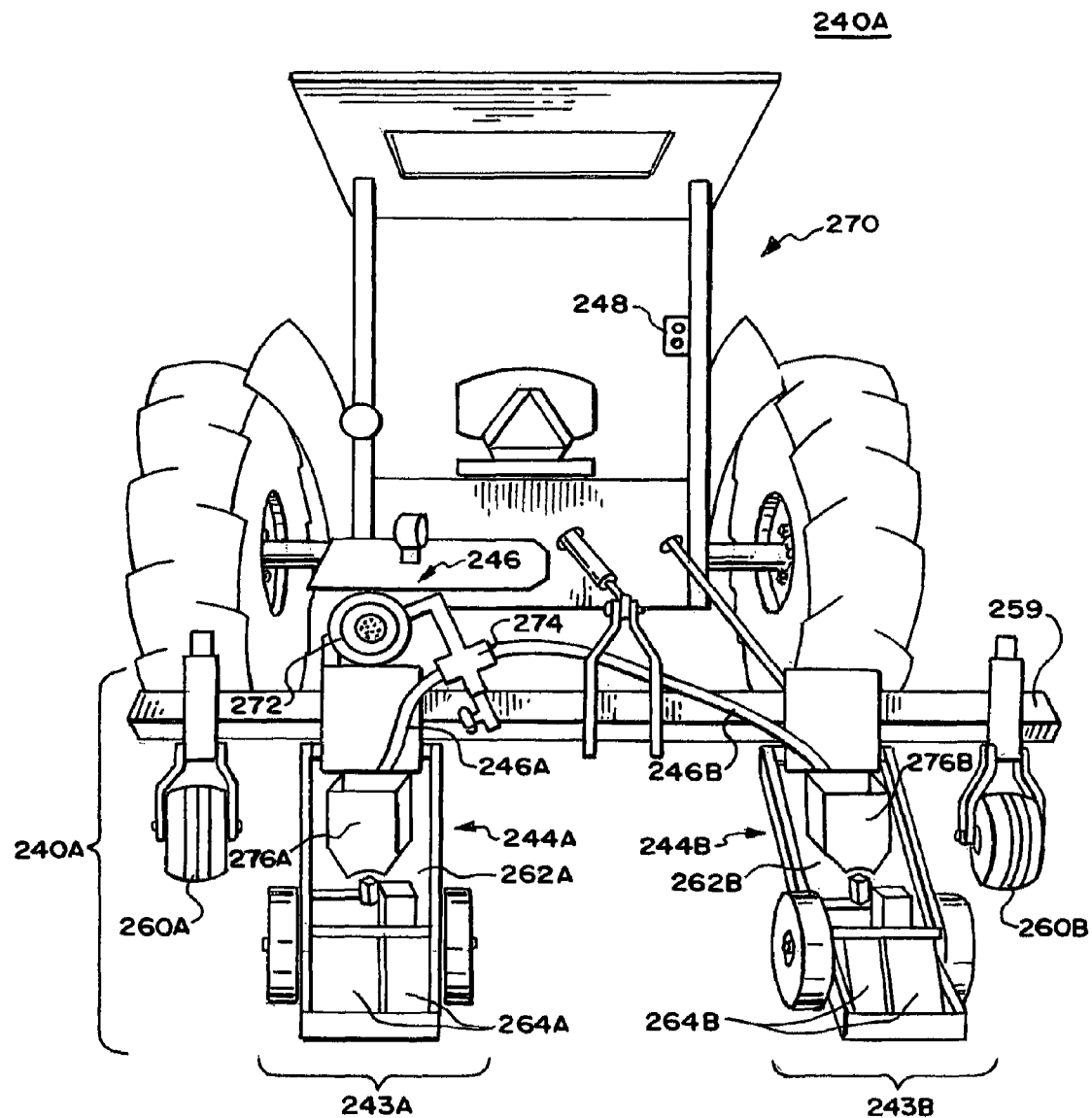
FIG. 23 is a perspective view of a tractor and planter usable in the embodiment of FIG. 1.

In FIG. 23, there is shown a perspective view of an embodiment of planter 240A intended for planting relatively small seeds such as cabbage, cucumbers or similar vegetable seeds. Planter 240A as shown in FIG. 23 includes within it parts for planting in two rows, with each being indicated as one of two row sections 243A and 243B having corresponding numbers with corresponding prefixes "A" or "B". The rows are adjustable with respect to each other on the planter.

The planter 240A is similar in many respects to prior art planters and, in the preferred embodiment, is a modification of an existing drawn planter of a type manufactured and sold by John Deere Corporation with the trademark Max-Emerge with the modifications being directed principally to the operation and mounting of the feeders indicated at 244A and 244B and a common separator section 246 supplying air to separator sections 246A and 246B. The planter includes a depth control gage having first and second depth control gage wheels (not shown in FIG. 23), first and second tool bar support wheels 260A and 260B, first and second furrow preparing sections 262A and 262B, first and second furrow closing and pressing sections 264A and 264B, and a tool bar 259. The feeders 244A and 244B and the separator 246 are adapted to be mounted on the planter to dispense a matrix to separate the seeds, and to cause them to drop into a furrow before it is closed and pressed.

The planter is adapted to be pulled by a tractor 270 in a conventional manner and the tractor 270, in some embodiments, has mounted on it a suitable monitor 248 and indicating displays to show the speed of movement of the tractor 270 and the rate of dispensing of the seeds by the feeder 244 or, in other embodiments, a count of the seeds to permit ready correlation of the speed of the tractor 270 with the rate of dispensing seeds to control the spacing of seeds. The common separator section 246 has a blower or other source of low pressure air 272 connected through a pressure gage 274 with two hoses 246A and 246B for separating seeds in each of the two feeders 244A and 244B. The feeders 244A and 244B have corresponding feed hoppers 276A and 276B for receiving the mixture of gel and seed and feeding it to a nozzle for separation by the separators 246A and 246B to be more fully explained hereinafter.

Figure 24:
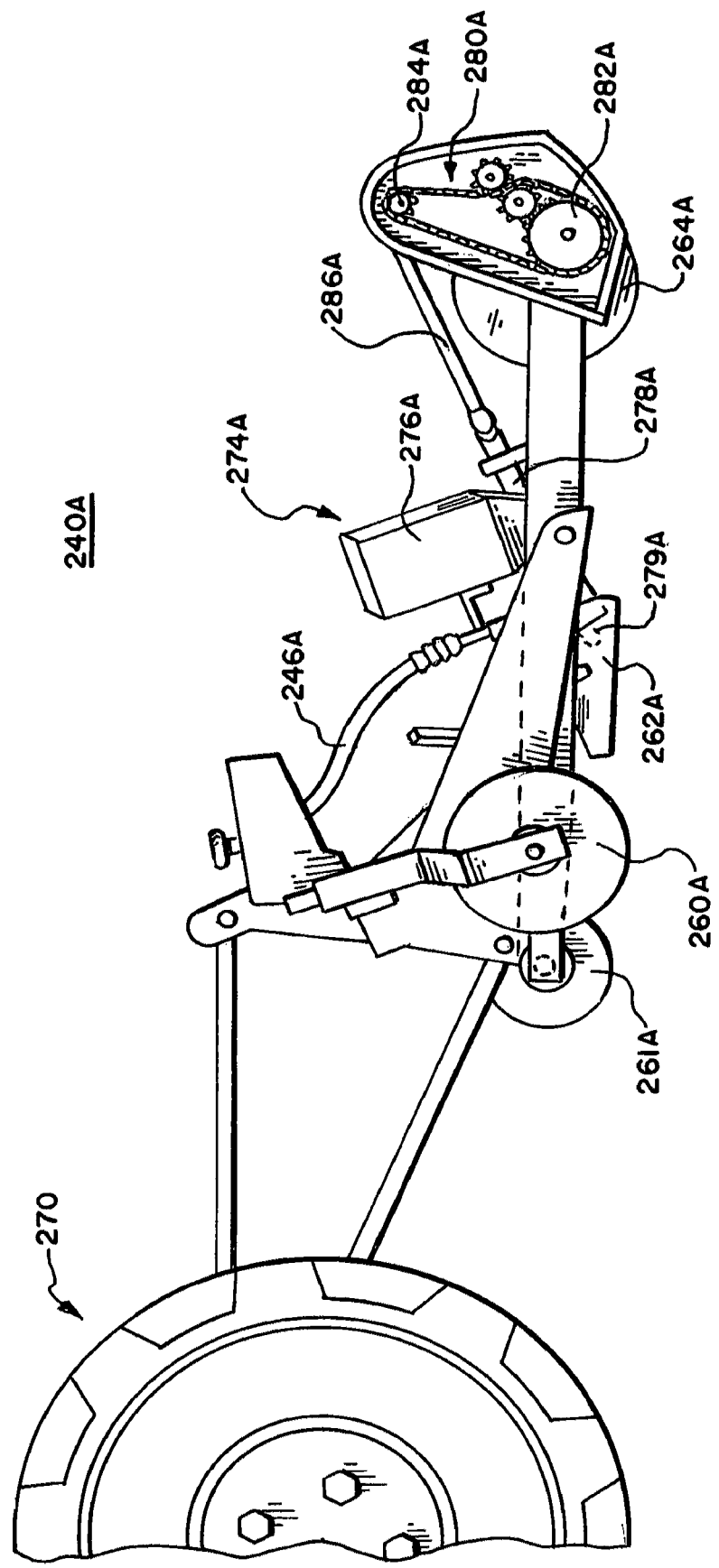
FIG. 24 is a fragmentary, elevational side view of a vegetable seed planter in accordance with an embodiment of the invention.

In FIG. 24, there is shown a side elevational view of the planter 240A from side A, showing one tool bar wheel 260A, one depth control gage wheel 261A, the furrow preparing section 262A and the furrow closing and pressing section 264A. As shown in this view, the separator common section 246 (FIG. 23) blows air through the separator hose 246A adjacent to the feed hopper 276A. The feed hopper 276A includes a bottom feed section 278A ending at the tip 279A of the bottom feed section 278A and separator hose 246A located adjacent to the furrow preparing section 262A and before the furrow closing and pressing section 264A to feed seeds and gel into the furrow after it is opened and before it is closed.

To drive the bottom feed section 278A at a speed related to the movement of the planter 240A, the furrow closing and pressing section 264A includes a chain and sprocket section 280A with a bottom sprocket wheel 282A rotating with the pressing wheels and driving a top sprocket wheel 284A through the chain drive. The top sprocket 284A rotates a shaft 86A through gearing, which shaft powers the bottom feed section 278A. A similar transmission for driving the feeder 244B (not shown in FIG. 24) is connected in a similar manner on the other side of the planter.

Figure 25:
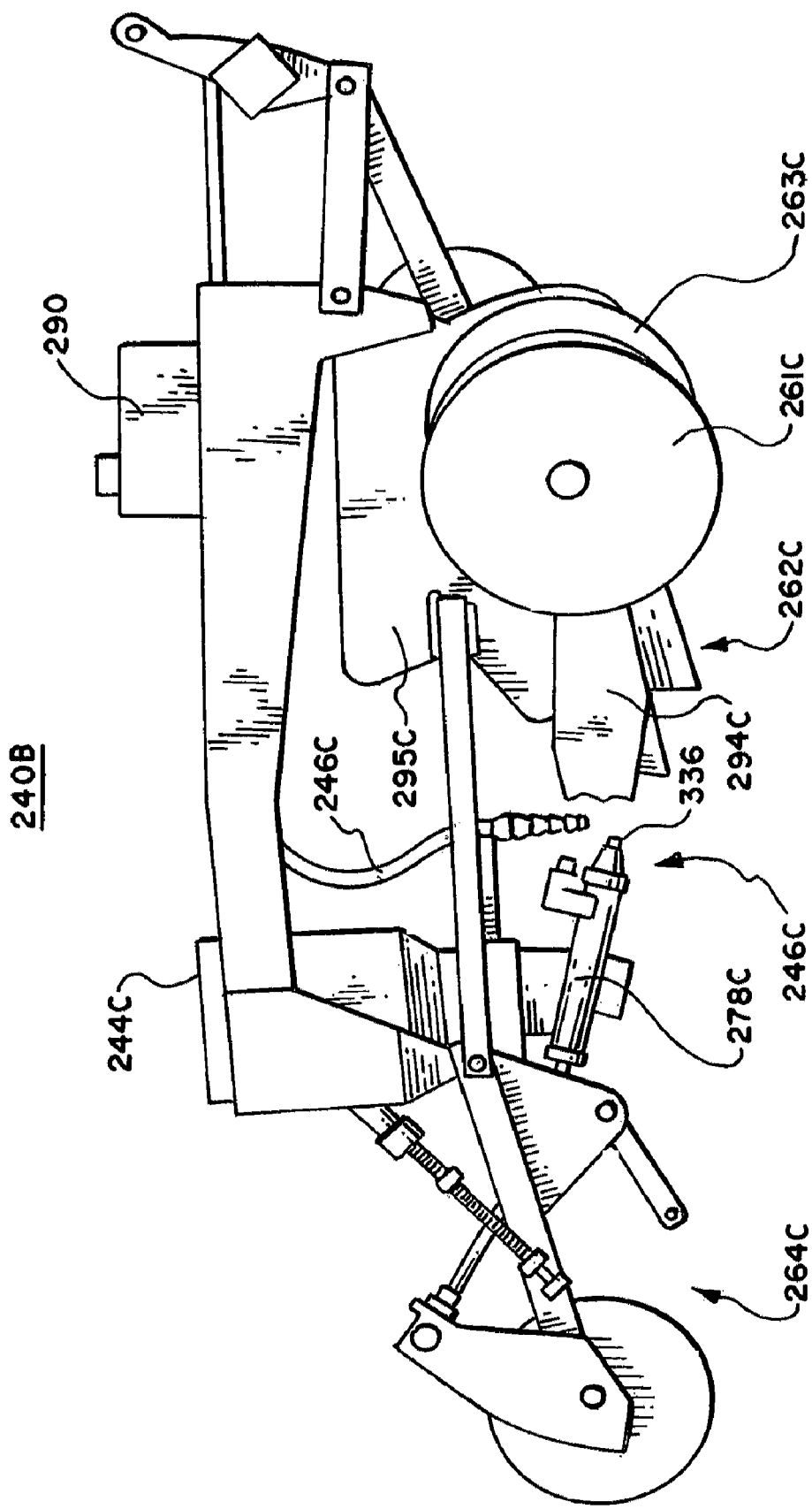
FIG. 25 is a fragmentary, side elevational view of another embodiment of planter.

In FIG. 25, there is shown a side elevational view of an embodiment 240B of planter intended for larger seeds, such as corn seeds, having as some of its parts: (1) depth control gage wheels, one of which is shown at 261C; (2) a plurality of disc openers, one of which is shown at 263C; (3) a plurality of furrow preparing sections, one of which is shown at 262C; (4) a plurality of separators, one of which is shown at 246C; (5) a plurality of feeders, one of which is shown at 244C; and (6) a plurality of sets of furrow closing and pressing sections, one of which is shown at 264C.

As in the embodiments of FIGS. 23 and 24, the embodiment of FIG. 25 contains a plurality of parallel row preparing sections for simultaneously planting a plurality of rows of seeds parallel to each other side-by-side and the embodiment of 240B is similar in many respects to the embodiment of 240A of planter. However, the embodiment of 240B includes a water reservoir and pump shown generally at 290, and a different furrow digging shoe to be described hereinafter. The water reservoir and pump 290 is used only to clean equipment and does not enter into the planting of seeds. The feeder 244C is shown with a bottom feed section 278C which feeds the seeds and matrix to its nozzle where the seeds are separated one-by-one by the separator 246C. As shown in this embodiment, the nozzle for the bottom feed section 278C and the nozzle for the separator 246C are placed in close juxtaposition with each other, and with the furrow being prepared so that the separator 246C blows air downwardly and perpendicularly to the ground or in a slight angle to the ground across the tip of the nozzle of the bottom feed section 278C, thus causing seeds as they are moved to the nozzle outlet to be forced away from the nozzle one by one to the ground.

To prepare the ground for receiving the seed and matrix, each furrow preparing section, such as 262C, includes a corresponding planting shoe, such as 294C, adapted to cooperate with and be aligned with a corresponding opener disks 263C. The shoe 294C is mounted for adjustment in depth to a mounting plate 95C which maintains it in position at a constant depth with respect to the ground. The bottom feed section 278C and the separator 246C are mounted adjacent to the shoe 294C to place the seed and matrix in the ground behind it.

Because the seeds are able to emerge sooner in this gel planter, the shoe 294C (shown broken away in FIG. 25) during planting is less deep than in many applications. It is adjustable in positions and in FIG. 25 is shown raised slightly above ground. The feeder 278C is driven in the same manner as the embodiments of FIGS. 23 and 24, but may be driven by separate motors if desired. The nozzle 336 of the feeder is positioned within wings of the shoe 294C at a distance from the ground and within the furrow forming element so as to cause the seed and matrix to be properly deposited.

Figure 26:
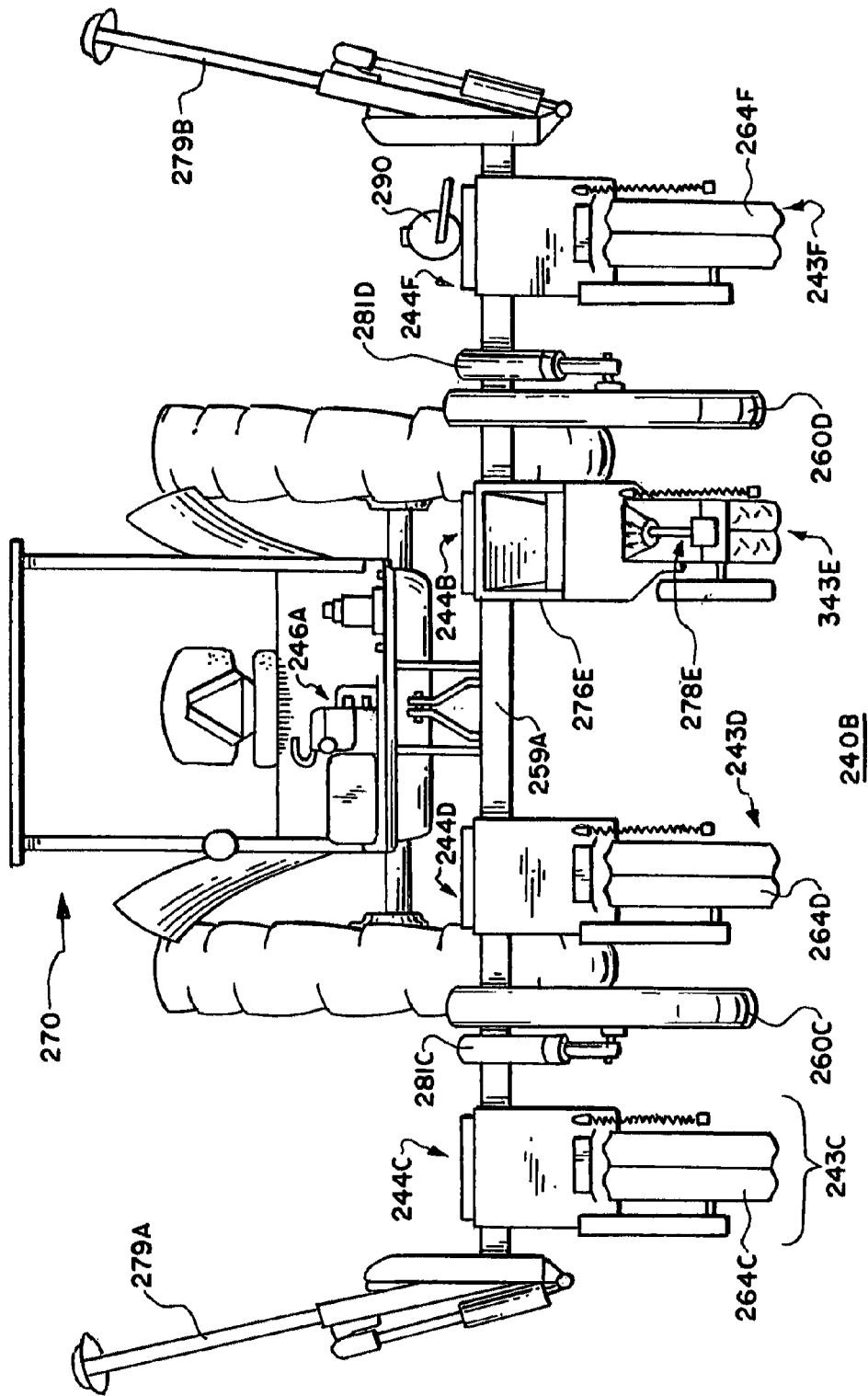
FIG. 26 is a simplified, perspective view of the embodiment of planter of FIG. 25.

In FIG. 26, there is shown a fragmentary, rear perspective view of the planter 240B four row sections 243C, 243D, 243E and 243F for forcing gel and seeds from their four corresponding feeders 244C-244F to the corresponding nozzles (not shown in FIG. 26). In the preferred embodiment, the bottom feed sections, one of which is shown at 278E, are controlled by the speed of the vehicle. However, they may be independent of the speed of the vehicle and controlled automatically or by an operator in conjunction with a separate speedometer for the tractor. This arrangement is especially advantageous when seed counters of the optical type are used since an adjustment can be made from the cab based on the seed count to maintain regular spacing. In such a case they may be driven by a separate hydraulic or electric motor.

As best shown in FIG. 26, the tool bar support wheels 260C and 260D are mounted by hydraulic cylinders 281C and 281D to the tool bar 259A in a conventional manner to adjust the depth or height of the planting shoes. The feeder, one of which is shown at 278E feeds into the furrow. Conventional row markers 279A and 79B mark the rows. To supply air under pressure to the feeders, the separator 246A includes a source of air under pressure and a pressure gauge mounted to the tractor and connected by hoses to supply air to a location near the seed feeder. In the preferred embodiment, the source of air under pressure includes a blower as described above.

Figure 27:
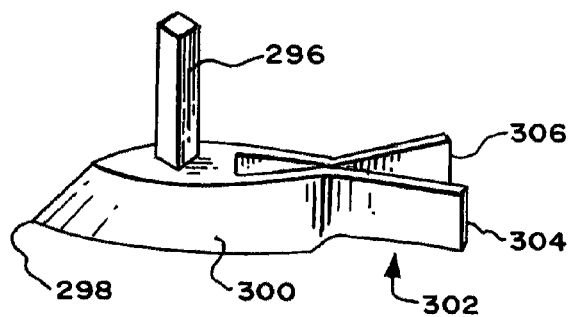
FIG. 27 is a perspective view of a planting shoe in accordance with an embodiment of the invention.

In FIG. 27, there is shown a perspective view of a planting shoe 294 having a mounting shaft 296, a cutting edge 298, a furrow forming portion 300, and a trailing portion 302. The mounting shaft 296 is generally square and attached to the top of the planting shoe 294. The planting shoe 294 is mounted horizontally behind the disk openers of the planter to prepare a furrow as it is moved through the ground. The cutting edge 298 is mounted so that it is substantially within the ground with its top flat surface above the ground. The cutting edge 298 is able to dig or deepen a furrow. Its furrow forming portion 300 widens the furrow, and its trailing portion 302 causes loose soil to be moved out of the way.

As shown in FIG. 28, its trailing portion 302 contains outwardly extending portions 304 and 306 and a cut away portion which permits some flexing as it passes through the furrow and forces the soil to the side. The seeds are fed between the outwardly extending portions 304 and 306 from a height sufficient to avoid clogging of the nozzle with dirt and close enough to the furrow to prevent the matrix and seeds from being moved outside the furrow while falling by various forces such as wind or vibrations.

In FIG. 29, there is shown a side elevational view of an embodiment of shoe 310 for planting larger seeds, such as corn, having a mounting bracket 112, two aligned cutting edges 314A and 314B, and a trailing portion 318. The cutting edges 314A and 314B and trailing portion 318 are substantially identical to the cutting edge 298 (FIG. 27), furrow forming portion 300 (FIG. 27) and widening portion 302 (FIG. 27). However, since the furrow should be deeper for these seeds, the cutting edge 314A is lower than the cutting edge 298 (FIG. 27) and the cutting edge 314B is wide to make a deeper, wider furrow. These designs of shoes enable the gel to fall within the groove and be relatively regular in location notwithstanding a slightly angled path of the gel from the nozzle caused by wind or vibration. To form a protective area for the matrix, gel and seeds to fall, the spaced apart portions 304 and 306 are spaced from each other where the seeds drop. The planting shoes 294 (FIGS. 27 and 28) and 310 are mounted to float at the level adjusted for the openers to which they are mounted under the control of the level gauge wheels in a manner known in the art, for this purpose the mounting lever 312 is mounted to the shoe 310 and the mounting lever 312 is movably mounted to an opener mounting bracket in a manner to be described hereinafter.

In FIG. 30, there is shown a perspective view of a feeder 244 and a separator 246 of a type which is most useful for small seeds, such as cucumber or cabbage seeds. The feeder includes a feed hopper 276A, a bottom feed section 278A, a motor output shaft 330, a mounting bracket 332, a vibrator 334 and a nozzle 336A. To expel seeds and matrix, the bottom feed section 278A is: (1) connected to and driven by the shaft 330; (2) mounted by the mounting bracket 332 to the frame of the planter; and (3) mounted to the feed hopper 276A from which it receives gel and seeds. It drives the seeds and gel under the driving force of the shaft 330 through the feeder nozzle 336 while the feeder nozzle 336 is vibrated by the vibrator 334. The shaft 330 is rotated by the chain and sprocket section 280A in synchronism with the speed of the planter across a field or by a motor. The separator 246 includes a nozzle 340, a hose 342 and a mounting bracket 144. The hose 342 is in communication with the source of air 272 (FIG. 23) of at least one pound per square inch pressure above atmospheric pressure and transfers that air under pressure through the hose 342 to the nozzle 340. The hose 342 is mounted to the feed hopper 276A by a mounting bracket 144 so that its nozzle 340 is above and pointing substantially perpendicularly downwardly toward the ground at a location just beyond the feeder nozzle 336 to blow air across that nozzle downwardly to the ground. The hose 342 is relatively stiff so that it may be mounted in position without moving under wind pressure or the like.

The feed hopper 276A is generally open topped and rectangular, being capable of holding several gallons of gel and seed with sides extending downwardly to a location close to the bottom feed section 278A where it is angled to communicate therewith. Other sizes and shapes of feed hoppers may be used, with the wall construction being adapted to cause the seeds and the gel to move into the bottom of the hopper 276A and into the feed section 278A without the seeds being separated by laminar flow against the walls of the hopper, or settling into groups of sides within the gel because of the period of time required for the large quantity of gel to be planted. Thus, the size of the feed hopper is related to the stability of the suspension of seeds and gel and is designed to retain uniformity in the dispersion of seeds within the feed hopper 276A until the seeds are driven through the feeder nozzle 336. The bottom feed section 278A for the feeder 244 includes a cylindrical casing having an axis generally perpendicular to the central axis of the feed hopper 276A or inclined at an angle thereto. The angle of the bottom feed section 278A is such as to cause gravity to aid in the feeding of gel from the feed hopper 276A through the feeder nozzle 336. The longitudinal axis of the feed means makes an angle with the longitudinal axis of the feed hopper 276A such that the feed nozzle 336 is lower and further away from the top of the feed hopper 276A than the end receiving the motor output shaft 330.

To move the gel and seeds with a positive force, the feed means has a generally cylindrical casing which may be mounted at its bottom end by a mounting bracket 332 to the housing or by any other means. It receives at one end the motor output shaft 330, which is rotated by a hydraulic motor or by gearing connected to the press wheels or any other mechanism to force the seed/gel mixture toward the feeder nozzle 336A. The feeder nozzle 336A extends from a cap or closure mounted about the bottom feed section 278A to emit gel downwardly such as that shown at 337.

To maintain seeds in the feeder nozzle 336A in a uniform suspension for dispersion in spite of possible laminar flow through the feeder nozzle 336, the vibrator 334 includes an electromagnet 350, a mounting base 352, a mounting bracket 354 and a yoke 356. The mounting base 352 is mounted to the cylindrical casing of the bottom feed section 278A by the bracket 354 and supports the electromagnet 350. The electromagnet 350 includes a U-shaped ferromagnetic outer member and a centrally located conductive winding connected to a source of alternating voltage that creates a flux path within the U-shaped ferromagnetic material first in one direction and then in the opposite direction to attract and repel a yoke.

To vibrate the nozzle 336, the yoke 356 includes a ferromagnetic spring and downwardly extending member which fits around and grasps the feeder nozzle 336. The ferromagnetic spring extends between the legs of the U-shaped ferromagnetic material, being firmly fastened at one end and spring-biased from the other end, so that the flux path through the U-shaped member pulls the free end of the spring toward it to complete a flux path in one direction, and releases it as the flux path changes directions, pulling it back again to complete the path in the other direction. This action vibrates the yoke 356 and the feeder nozzle 336 at a frequency and amplitude sufficient to maintain a smooth flow of seeds. While a typical ferromagnetic vibrator has been disclosed, there are many such vibrators of different types available commercially and other vibrators may be utilized if it vibrates the yoke 356 at a frequency and displacement amplitude: (1) sufficient to prevent the separation of seeds from the matrix while the seeds are still within the feeder nozzle 336 as the gel and seeds flow from the feeder nozzle 336, such as by friction against the walls; and (2) also sufficient to aid the separation of gel and seeds outside of but in contact with the feeder nozzle 336 in a controlled manner with the aid of air flow from the separator nozzle 340. The principal purpose of the vibrations is to maintain an even dispersion of seeds and gel as the gel and seed matrix flows through the nozzle after it has left direct contact with the auger's shear force members.

The vibrations should be at a frequency suitable for the purpose intended, and generally having a longer wave length than the area of the seeds. It should generally be between 20 cycles per second and 10,000 cycles per seconds with an amplitude of between one millimeter and 3 millimeters to prevent the seeds as they push through the nozzle from being lodged in the exit and plugging the nozzle. The amplitude of the vibrations should be sufficient to create an inertia effect between the seed and the gel and, thus, is related to the viscosity of the gel and the density of the seeds. In general, it should create an acceleration of at least one micron per second, per second.

The separator 246 is intended at regular intervals to force seeds and matrix arriving at the tip of the feeder nozzle 336 to be separated and drop to the ground. It may be a mechanical vibrator which passes across the opening or a rotating fan-like mechanism but in the preferred embodiment, is a jet of air having approximately a pressure of one pound per square inch above atmospheric pressure. To properly separate the seeds, the air stream should be between 1/10th of a pound per square inch and 3 pounds per square inch above atmospheric pressure or below atmospheric pressure if it is a vacuum pump position to remove gel and seeds and permit them to drop by gravity. Preferably, the air stream passes directly across the tip of the feeder nozzle 336A in a vertical direction in a plane perpendicular to the longitudinal axis of the feeder nozzle 336 and perpendicular or at a slight angle in a plane passing through the longitudinal axis of the feeder nozzle 336, the angle along the longitudinal axis of the delivery tube being no more than 60 degrees on either side of a normal to the ground within a plane passing through the longitudinal axis of the auger and being no more than 30 degrees from a normal to the ground in a plane perpendicular to the longitudinal axis of the auger.

In FIG. 31, there is shown another embodiment of feeder 244A connected to the separator 246 and having an identical vibrator 334, mounting bracket 352, bottom feed section 278A and shaft 330. However, the feed hopper 276B differs from the feed hopper 276A of FIG. 30. The differences are generally intended to accommodate larger seeds than that of the feed hopper 276A of FIG. 30 by making the concentration of the seeds into the bottom feed section 278A easier.

The feed hopper 276B includes an enlarged top portion 360, an inwardly angled portion 362, a narrow portion 364 and an auger portion 366 which is attached to the bottom feed section 278A. The bottom feed section 278A has an auger 370 within it which is rotated by shaft 330 from the chain and sprocket section or from a motor to move the gel toward the feeder nozzle 336B. The narrow portion 364 narrows down to force gel onto the auger 370 where it can be moved within the cylindrical bottom feed section 278A which encases it so that the threads of the auger 370 successively move the gel to the feeder nozzle 336.

To facilitate flow of the mixture, the narrow portion 364 is at an angle so that the bottom feed section 278A tilts downwardly with the feeder nozzle 336B being below the shaft 330. The narrow portion 364 connects the auger portion 366 with the inwardly angled portion 362 which causes the mixture to slide inwardly. The enlarged top portion 360 is above the inwardly angled portion 362 to contain more material and yet by gravity force the mixture downwardly onto the auger 370.

In FIG. 32, there is shown a plan view of the feeder 244A having a feed hopper 276A, an auger 370, and the nozzle 336. The feed hopper 276A has: (1) an open top end to receive gel and seed; and (2) a bottom end communicating with the auger 370 to supply a mixture of seed and gel thereto. To receive gel and seeds, the feed hopper 276D has: (1) an enlarged top portion 360 having a rectangular cross section with straight vertical sides; (2) a smaller center or connecting portion 362 having inwardly tapered walls connecting the top end portion and lower portions; (3) a lower narrow portion 364 having a rectangular insertion; and (4) an inwardly tapered section or auger portion 366 ending with the auger 370 at the bottom. The auger 370 has at one end a pin connection 372 for connecting to the shaft 330 (FIG. 31) to rotate the auger 370 and at its other end a termination land 374 intended to eject seeds. The auger 370 contains threads within a compartment 180 located at the bottom of the feed hopper 276A and opening upwardly into the feed hopper 276A. The threads of the auger extend within the nozzle 336A shown at 182, the nozzle 378A being a closed cylinder surrounding the end of the auger 370 and ending in an opening 384 which opening has tappered walls and an oriface through which the seeds and gel pass. The bottom compartment 180 is not as long as the trended portion of the shank of the auger. An unthreaded portion 381 of the auger, at least one inch long, fits within the compartment 180 for receiving gel to be moved by the auger to the nozzle.

The feed hopper 276A, auger 370 and nozzle 378A are designed with dimensions selected to prevent: (1) cracking of seeds between edges of the auger 370 and the nozzle 378A or feed hopper 276A; (2) the separation of seeds by laminar flow against surfaces, resulting in eventual blocking of the nozzle 378A; (3) pulsating output of seeds and gel caused by irregular delivery from the auger 370 through the opening 384; and (4) improper spacing of seeds by disruption of the even dispersion of seeds within the gel. To reduce cracking of the seeds, the angle of the threads of the auger 370 at their upper edge and the angle of the bottom feed section 278A or the feed hopper 276A at the location where the gel is first pushed from the feed hopper 276A into the bottom feed section 278A are selected to avoid a scissor effect which may crush seeds. For this purpose, the angle of the flight where it passes into the tube and the angle of the wall within the feed hopper 276A that it contacts are selected to be equal so that flight and wall operate as an edge moving parallel toward an edge. This structure permits maximum gel to be drawn into the bottom feed section 278A and avoids a scissor effect which may catch the seeds and crack them.

To reduce the separation of seeds by laminar flow as the gel moves down the feed hopper 276A, the feed hopper 276A is of a sufficient size to create downward pressure into the auger compartment and has angled walls which are related to the viscosity of the gel and the size and density of the seeds. The bottom angled surface is intended to channel the gel directly into the auger 370 rather than permitting it to lie against a flat surface where seeds may eventually separate out by slow motion of the gel or motion of the gel in a horizontal plane against the bottom of the feed hopper 276A. The straight surfaces are intended to create a head of weight which tends to force the gel downwardly with pressure against the slanted surfaces.

To prevent blocking near the end of the bottom feed section 278A where the matrix of seeds and gel enter it from the feed hopper 276A, the depth of the grooves in the auger is sufficiently deep and the angle of the threads' sufficiently great to cause the gel to be moved with only a small surface area of gel with a large bulk moving in contact with a stationary surface at a rate which is not conducive to laminar flow. The threads are shaped in this manner because laminar flow may otherwise cause separation of seeds against the surface of the grooves and eventually result in clogging. The actual flow is turbulent and conducive to some mixing that maintains the seeds in suspension.

The depth of the grooves in the auger varies with the size of the seed and the amount of gel. The angle of the threads is correlated with a number of factors to control the speed of movement of the surface of the gel against the walls of the bottom feed section 278A, the other factors being: (1) the spacing between seeds; (2) the speed of the planter across the ground; (3) the density of the seeds within the gel; (4) the angle of the threads of the auger 370; and (5) the number of revolutions per minute of the auger 370. To reduce separation at the exit end of the bottom feed section 278A, the angle of the termination land 374 is sharpened to push gel and seeds out at a greater velocity. Thus, the angle of the inlet end of the bottom feed section 278A matches the threads and the threads have an angle at that location which is different than the angle at the exit end.

Figure 34:
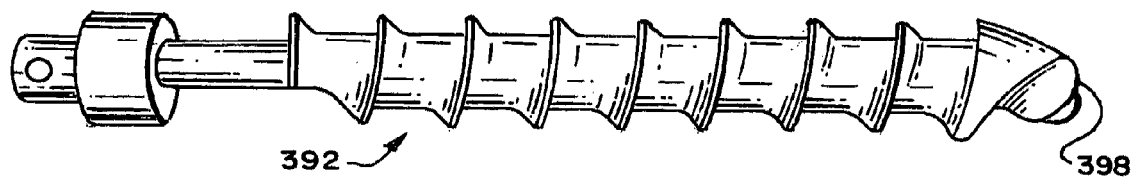
FIGS. 34-36 are elevational views of embodiments of auger usable in a feeder such as that shown in FIGS. 31-33.
Figure 35:
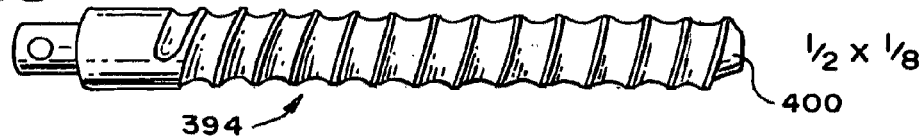
Figure 36:
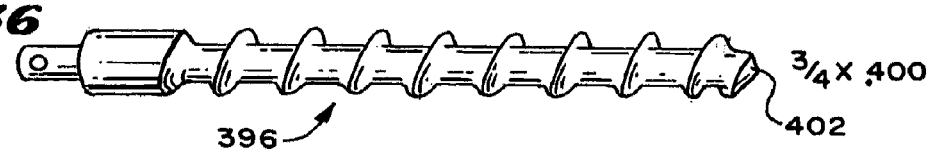

To reduce plugging of the nozzles: (1) the angle of the termination land 374 and the angle of narrowing of the bottom feed section 278A are selected for maximum ejection velocity, (2) an air separator is used as described above; and (3) a vibrator is used as described above. The end thread of the auger extends into the tapered portion of the nozzle to create a force as the taper occurs to increase velocity and thus reduce clogging. The vibration appears to create turbulence and avoids the lodging of the seeds at this location. Since the viscosity of the gel affects both the settling rate and the ability to separate at the nozzle, it is chosen with both factors in mind. Some gels change in viscosity with time and so seeds which have been preconditioned are mixed with the gel and the gel immediately used since its viscosity can be controlled at the starting point. This also reduces the possibility of the gel drowning the seeds for lack of oxygen because of the short time that they are actually in the gel and yet permits rapid and synchronous emergence of plants that are planted from the fully hydrated seeds with the invention.

The threads between grooves are shaped with a flat top edge which can closely engage the walls of the bottom feed section 278A and a thickness which is low compared to the size across of the groove to permit the gel and seed matrix to be carried in pockets sufficiently large as compared to the surfaces against which the open end of the grooves move so that with the auger rotating at a speed sufficiently low, separation by laminar flow is low. Generally, the edges of the threads should be less than 1/10th of the open surface between threads in the grooves and the grooves should be at least as deep as the linear length of the open space. The diameter of the screw should be such with the above constraints as to prevent motion between the walls of the bottom feed section 278A and the gel greater than 36 linear inches per minute for average viscosity gels.

To prevent the output from pulsing, either: (1) the angle of the threads is uniform; or (2) the ratio of depth to width of the grooves of the auger 370 are selected so that there is not a great difference in the delivery rate during different portions of a revolution of the auger. Similarly, the width of the edge and slope of the threads are selected to avoid a dead space into the nozzle. A shallow, wide groove causes more of the gel and seed to be exposed to frictional and centrifugal forces while being moved toward the nozzle in the bottom feed section and thus creates better mixing for a uniform distribution of seeds but increases the possibility of the seeds being removed by frictional forces against the surface.

The angle of the threads, except for the front end, should be at least 15 degrees and is preferably 22 degrees with a pitch of 1.5 per inch single groove. The angle at the land at the tip of the auger is much sharper and should form an acute angle no greater than 15 degrees to cause a rapid acceleration of the matrix and seeds and gel at the tip. While in the preferred embodiment, the pitch and angle of the auger 370 is sharply increased only adjacent to the nozzle 336A or 336B. it may have a different pitch within the bottom feed section 278A than within the feed hopper 276A itself since the tendency to separate out is greater in the bottom feed section 278A where it is surrounded by tube wall with no open side. Throughout the auger 370, it is desirable to form the trailing edge of each thread to aerodynamically pull the gel forward and the forward edge to push the gel forward.

In FIG. 33, there is shown a fragmentary perspective view of a planter illustrating the positioning of the feeder 244A, the planting shoe 310, the separator nozzle 340 and the gauge wheel 261A in a furrow preparing section 262A. As shown in this view, the planter is mounted to the gauge control wheels 261A behind the openers and to the access of the gauge control wheels where it floats as attached by the lever 312 to a floating adjustable support 313.

To permit floating at an adjustable height, the lever 312 is pinned at 315 to the level adjustment support 313 which is also mounted to the gauge wheel shaft at 317 but is adjustable in height thereabout by means of a lever 119, so that: (1) the tip of the shoe 310 is mounted at the same level as the opener adjacent to the depth gauge wheel 261A; (2) the rear portion of the lever 312 is pinned at 315 at a height adjustable by the lever 119 with its bottom connected to the top of the shoe; and (3) the shoe rear, lever 312 and level adjustment are all free to move upwardly or downwardly a short distance under the control of a spring bias lever 321 by pivoting about the pin 315 and shaft 317. Between the wings of the trailing section 318 of the shoe 310, the separator nozzle 340 and the nozzle of the feeder 278A are positioned adjacent to each other to be shielded by the trailing edge 318. The amount of movement of the shoe is insufficient to remove the separation tip and nozzle tip from the wings of the shoe at 318 where they are protected from dirt or wind which might otherwise disrupt their operation.

With this arrangement, room is provided within the furrow digging mechanism for the separator nozzle and feeder nozzle within a protected location that shields the nozzles from being clogged by dirt or having the seed moved aside by excessive wind and yet permits them to be close to their final location with respect to the ground for planting. The amount of spring bias and dimensions of the shoe mounting are related so that the floating action of the shoe does not expand the nozzle tips.

In FIGS. 34, 35 and 36, there are shown three different augers 392, 394 and 396, respectively, with the three augers being for different size seeds. The auger 392 has a shank with a larger diameter and a larger pitch or angle to the threads at the tip. The grooves between threads are also larger and the threads have a smaller angle. It is adapted for seeds the size of corn. The auger 394 is for small seeds such as carrot or lettuce and has a tip 400 with a smaller pitch. Generally, it has a ½ inch outer diameter, with a one inch lead between threads and a depth of ⅛ inch between the grooves and the top edges of the threads. FIG. 36 shows an auger for medium size seeds such as onion seeds having a ¾ inch lead between threads and a 0.40 depth of the groove. Its tip 400 is a still lower angle tip. In general, the augers have a pitch of between one-half inch and three inches and a groove depth of between 1/16 of an inch and three inches. The shank lengths are between two inches and six feet long and their diameters are in a range of 1/16 inches to six inches.

Figure 37:
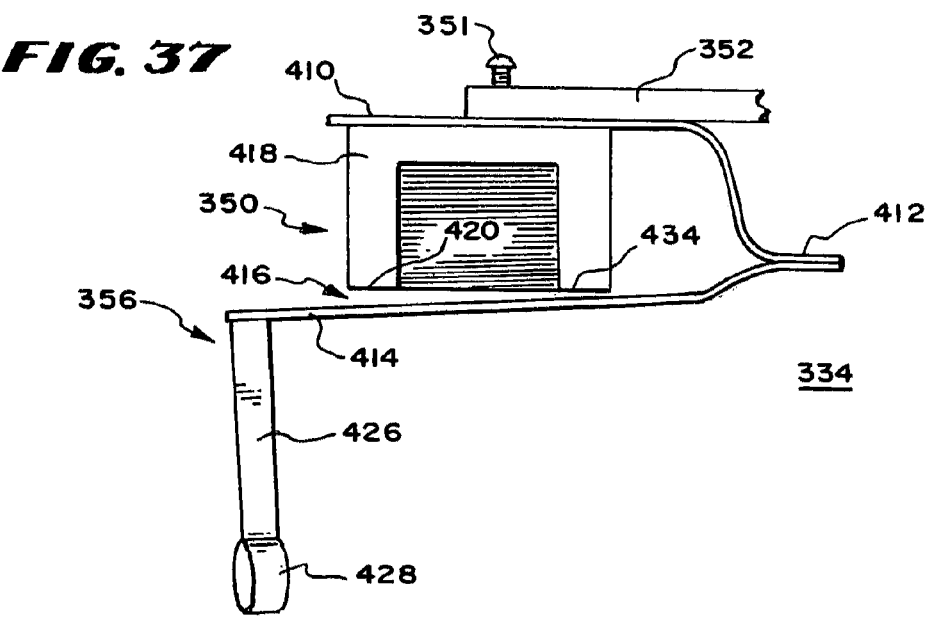
FIG. 37 is a perspective view of an embodiment of vibrator usable in the feeders of FIGS. 31-33.

In FIG. 37, there is shown an elevational view of the vibrator 334 and a mounting bracket base 352, with the vibrator including an electromagnet 350 and a yoke 356. The mounting base is connected to the mounting bracket 354 (FIG. 31) as described above, and the base 352 is connected to the vibrator by a top screw 351 for firm mounting. To permit vibration of the yoke 356 by the electromagnet 350, the electromagnet 350 includes a leaf spring 414, a ferromagnetic outer base 418, and a coil. The metal extension 410 is connected at 412 to the ferromagnetic leaf spring 414 which is biased a slight distance shown at 416 from the electromagnet 350. The outer base 418 is an inverted U-shaped ferromagnetic member having two end portions 420 and 434 and surrounding the electromagnetic coil which is electrically connected to a source of AC potential as described above. To vibrate the nozzle, the yoke 356 includes a downwardly extending arm 426 and a collar 228, with the arm 426 being connected to the ferromagnetic leaf spring 414, which is separated from the ends 420 and 434 by the gap 416 and attached at its other end to the collar 228 for vibrating the nozzle (FIG. 32) of the drive means for the feeder 244.

Figure 38:
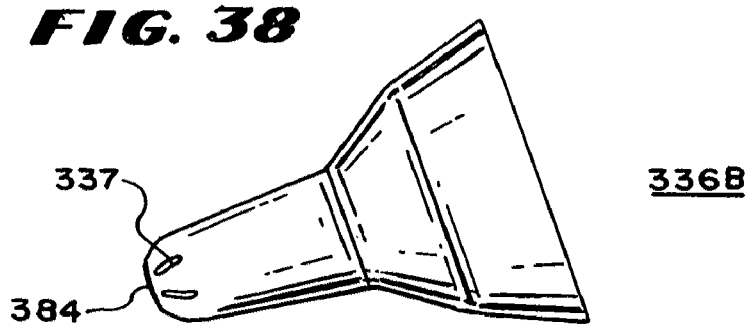
FIG. 38 is a perspective view of a nozzle usable in the feeder of FIGS. 31 and 32.

In FIG. 38, there is shown a nozzle 336B having a land 384 and one or more slits 337. The nozzle is made of an elastomeric material such as rubber and capable of expanding. The slits and the rubber construction are adapted to seeds which have a small amount of gel with them and thus provide a solid mass to squeeze through the tip one by one in the singulation process, but not generally being able to escape by gravity. At the tip, they are vibrated by the vibrator as described above and singulated by air. In the alternative, the fixture 20C as described in connection with FIG. 12 may be used to separate the seeds one from the other and expel them.

Figure 39:
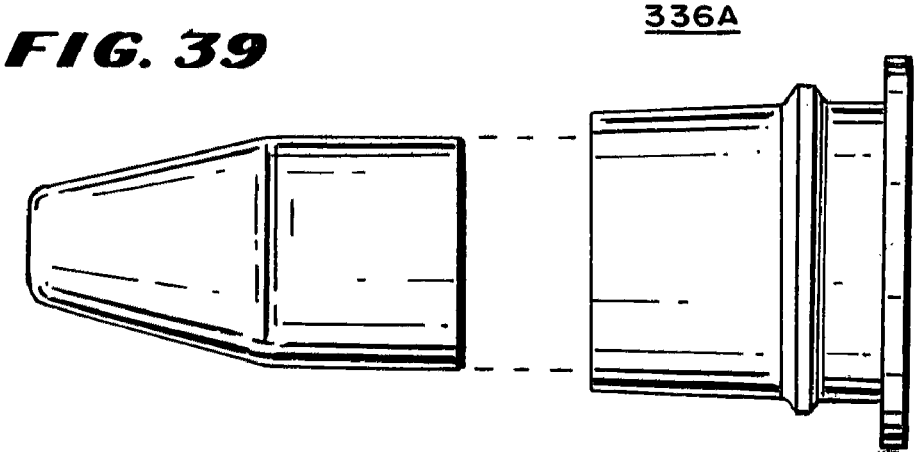
FIG. 39 is an elevational view of a nozzle usable in the embodiment of FIG. 31.

In FIG. 39, there is shown a nozzle 338 which is formed of relatively rigid plastic and adapted to receive small seeds containing a large amount of gel. This nozzle does not expand but vibrates and has sections of gel removed by the separator containing seeds for singulation. The gel has sufficient self adhesion to prevent the seeds from escaping the tip of the nozzle prematurely by gravity.

Figure 31:
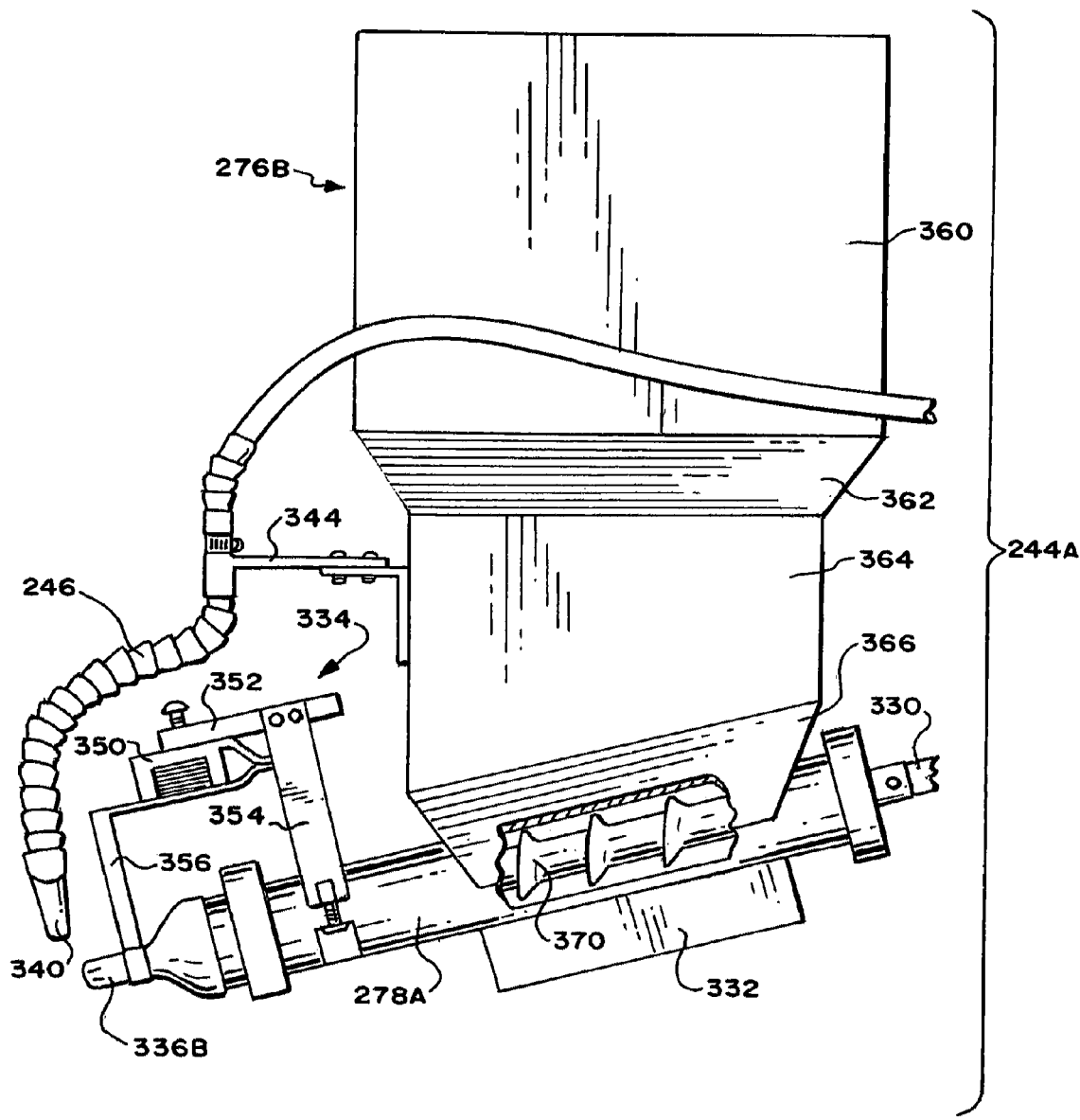
FIG. 31 is an elevational view, partly broken away of another embodiment of feeder usable with the planters of FIGS. 25 and 26.
Figure 32:
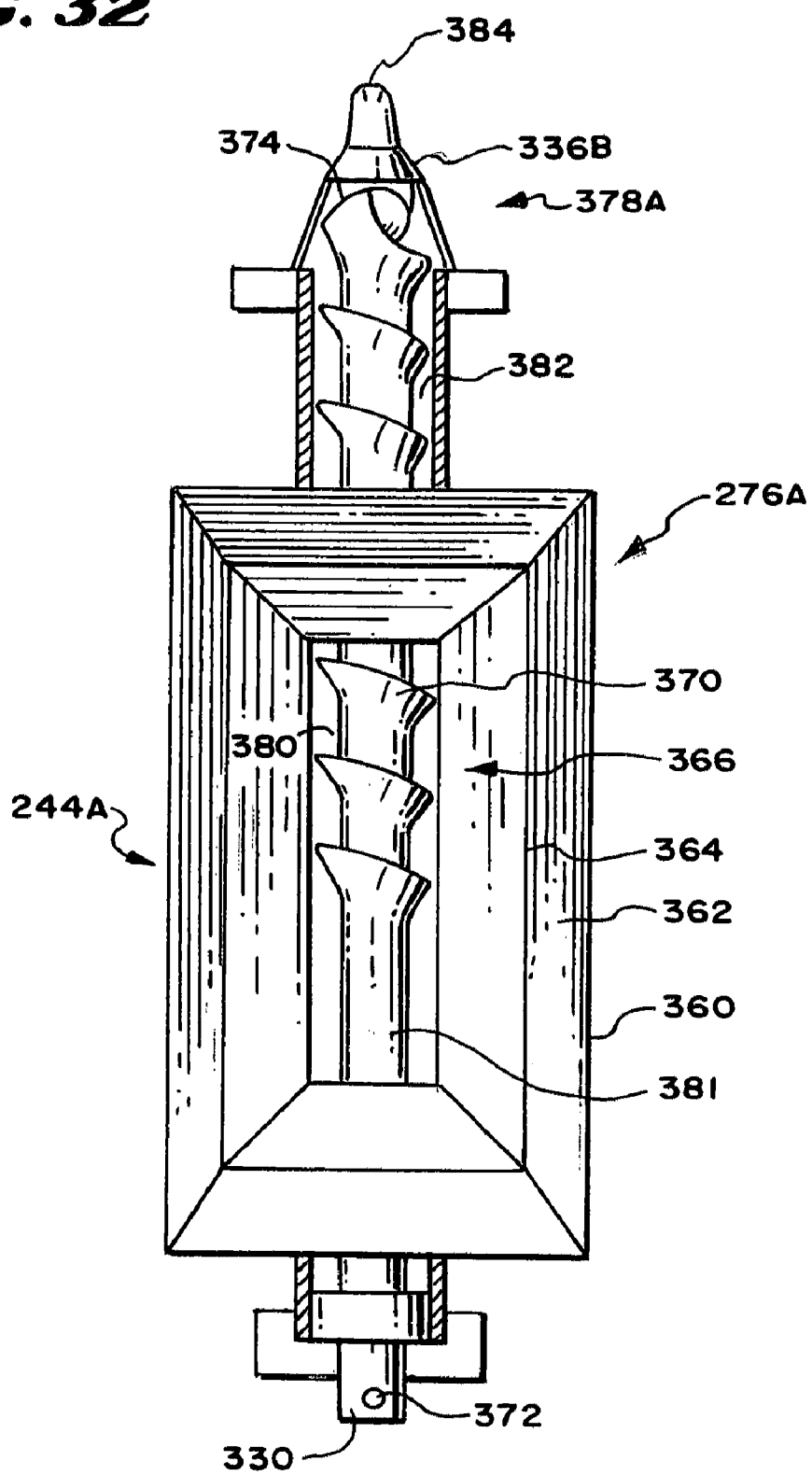
FIG. 32 is a top view of the feeder of FIG. 31.
Figure 33:
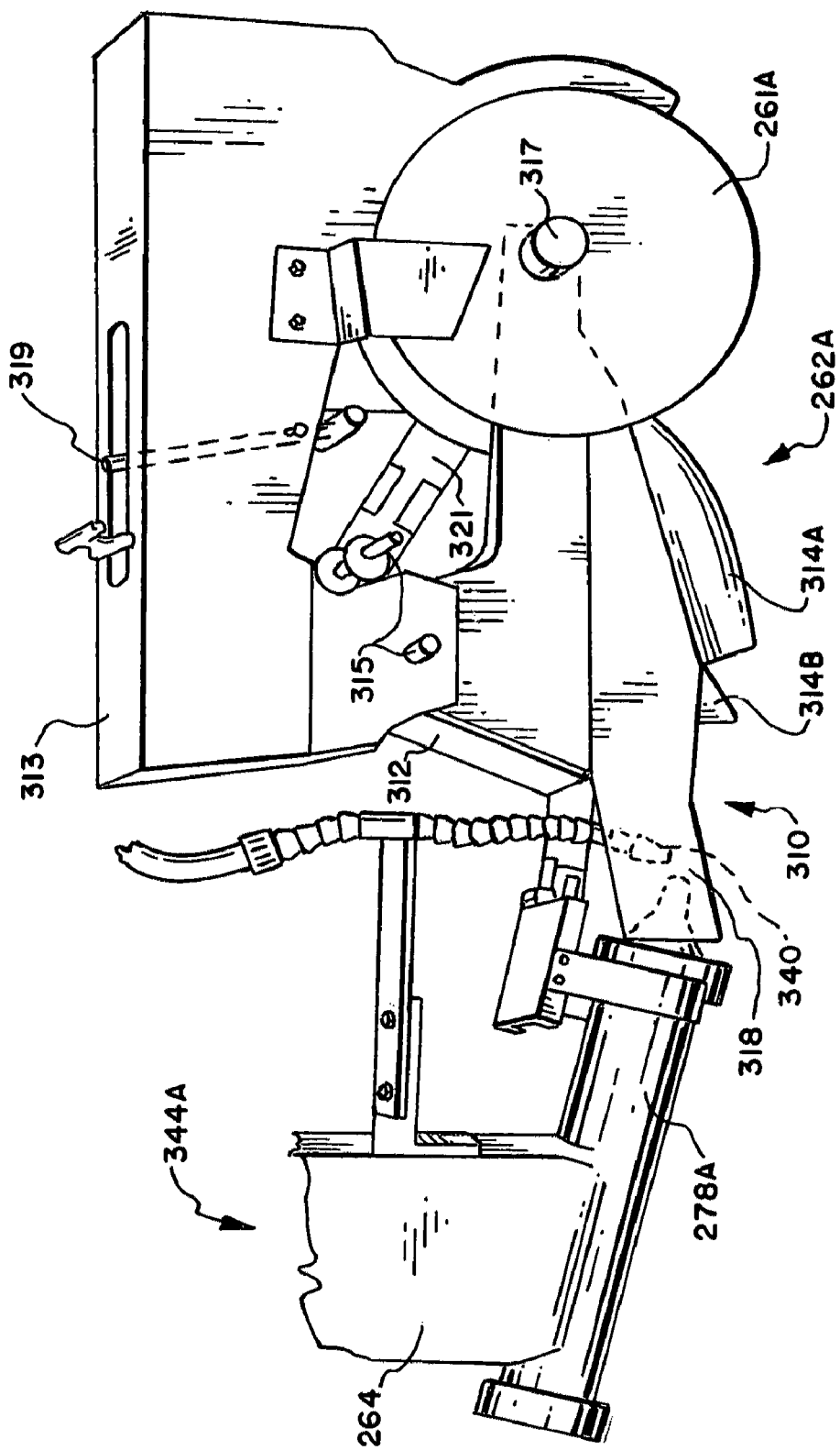
FIG. 33 is a fragmentary perspective view of the planter of FIG. 25, the shoe of FIG. 29 and the feeder of FIGS. 31 and 32.
Figure 40:
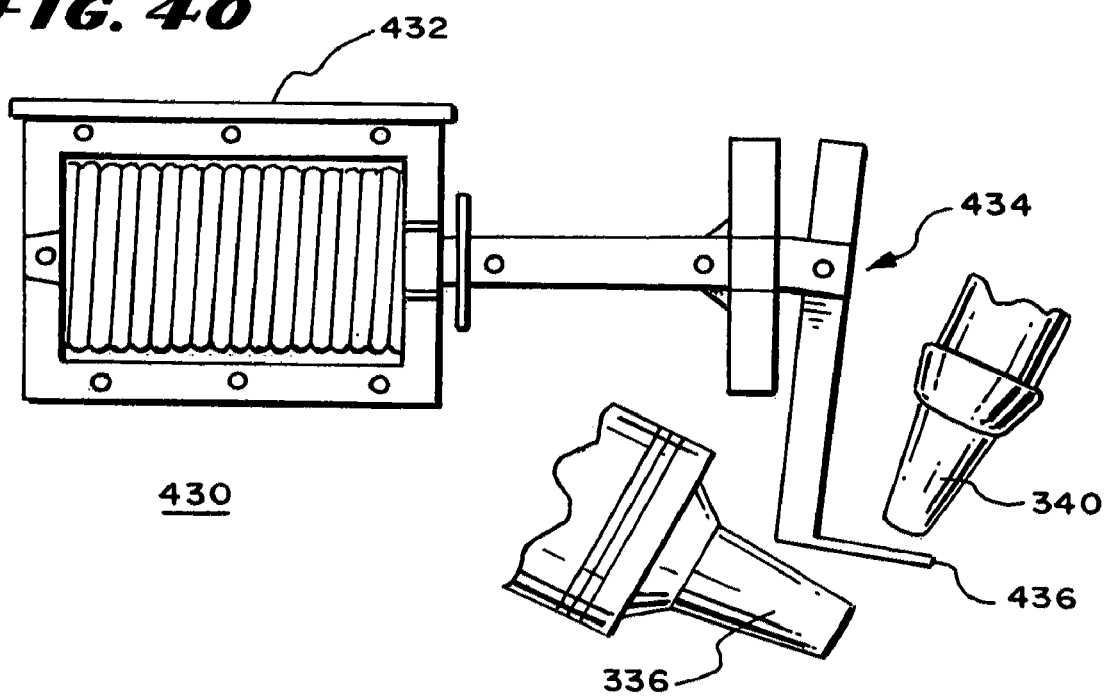
FIG. 40 is an elevational view of an air flow blocker usable in one embodiment of feeder.

In FIG. 40, there is shown another embodiment of feeder 444 and separator 446 substantially the same as the embodiments of FIGS. 30, 31 and 32 except it is specially designed for careful placement of seeds by causing the seeds to fall within a group of preselected target areas. For this purpose, it includes a spacer 430 comprising a solenoid 432 and a solenoid operated lever 434 positioned in juxtaposition with the separator nozzle 340 and the feeder nozzle 336. The solenoid 432 may be any type of solenoid capable of moving the solenoid operated lever 434 so that the lever moves a blocking mechanism 236 over the orifice in the separator nozzle 340 to interrupt the air therefrom. With this embodiment, the solenoid 432, when actuated, moves the solenoid operated lever 434 into the path of the separator nozzle 340 so that seeds and matrix are not forced from the feeder nozzle 336 by a stream of air under pressure from the separator nozzle 340. When the feeder nozzle 336 is directly over the target area, the solenoid 432 is de-energized to release the solenoid operated lever 434 and open a path for the air from the separator nozzle 340 to blow across the feeder nozzle 336, thus removing the gel and seed which accumulated while the air was blocked from the feeder nozzle 336.

Figure 41:
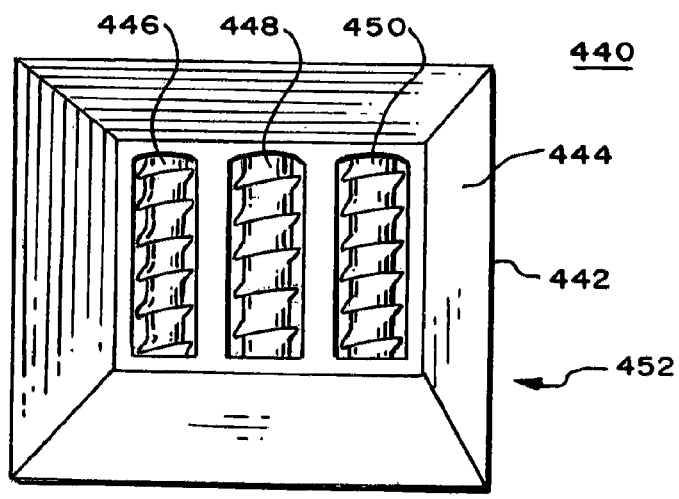
FIG. 41 is a top view of another embodiment of feeder.

In FIG. 41, there is shown a plan view of still another embodiment 440 of feeder having a hopper and first, second and third augers 446, 448 and 450. The hopper includes a rectangular outer wall portion 242, an inwardly tapered wall portion 444 ending in a flat bed which receives within recesses the augers 446, 448 and 450. This embodiment 440 is similar to prior embodiments except that there are three augers forming three drive means for three different rows of seeds within a single hopper 452.

Figure 42:
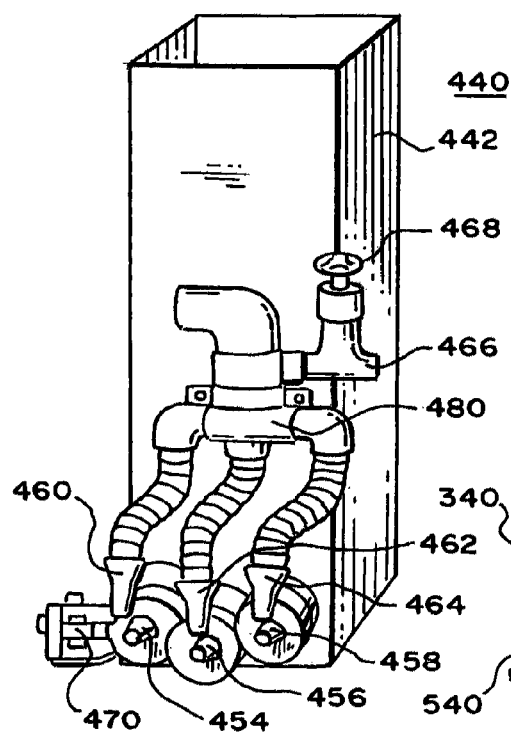
FIG. 42 is a perspective view of the feeder of FIG. 38.

In FIG. 42, there is shown a perspective view of the embodiment 440 of three-row feeder and separator showing the single hopper 452 mounted vertically with three nozzles 454, 456 and 458 extending therefrom to be vibrated by a single vibrator 470 having yokes about each of the nozzles for vibrating them as described above in connection with single row feeders and separators. Adjacent and above each of the nozzles 454, 456 and 458 are corresponding separator nozzles 460, 462 and 464 adapted to be connected to a manifold 480 which receives a source of air under pressure at the connection 480 under the control of the valve 468 so as to control the pressure of the air flowing across the nozzles. This embodiment of feeder and separator operates in the same manner as the prior embodiments and is adapted to be mounted to a planter to plant adjacent rows in close juxtaposition from a single hopper. It has the advantage of economy and the ability to plant closely spaced rows of seeds.

Figure 43:
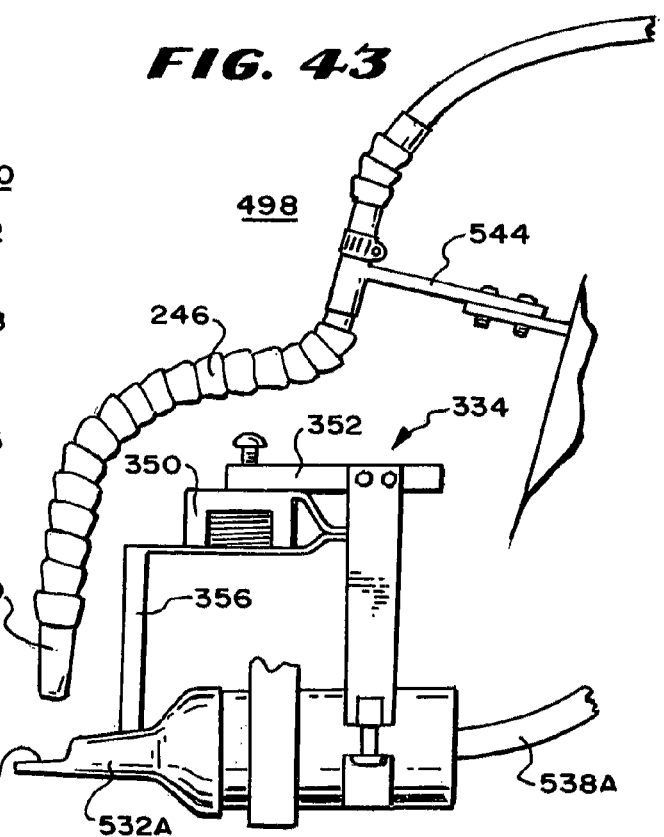
FIG. 43 is a perspective of apparatus for supplying additives to fields.

In FIG. 43, there is shown an embodiment of a gel-chemical dispenser 498 having a separator 446, an additive source 500, a peristaltic pump 534 and a nozzle 532. The gel-chemical dispenser 498 may be used alone or mounted in tandem with a feeder 444A (FIG. 31) to have gel with additives separated by air from a nozzle 532 and deposited with seed from the feeder 444A or alone. Moreover, it may be used with a spacer 430 (FIG. 40), and if used with a spacer 430, may be synchronized with a similar spacer and a feeder to deposit additives with seed.

A separator 446, which is substantially the same as the separators used in the embodiment of FIG. 31, cooperates with the nozzle 532 but may be arranged differently with the nozzle 532 in one embodiment from the arrangement of FIG. 31. A nozzle for the chemical additives similar to the nozzle 536A (FIG. 39) may also be used, and in this case the separator 446 may be positioned in a manner similar to the position it is used in the feeder 444A (FIG. 31) to deposit additives and gel or a separator may not be used at all to deposit a tubular column of gel and additives. The pump 534 communicates with a source of gel and chemical 530 through a plurality of conduits, two of which are shown at 536A and 536B, to pump this combination of gel and chemical to a plurality of nozzles, one of which is shown at 532A, through a plurality of conduits, two of which are shown at 538A and 538B.

The peristaltic pump 534 may be any suitable peristaltic pump such as for example pumps sold under the trademark Masterflex by Cole-Parmer Instrument Company, Chicago, Ill., which may be driven by a shaft such as shaft 286A (FIG. 24) by a wheel so as to synchronize pumping rate with travel speed or pumps sold by Cole-Parma under the trademark ISMATIC if driven by a separate motor controlled by the operator to maintain delivery speed in accordance with speed of the dispenser with respect to the field. Moreover, pumps other than peristaltic pumps may be used.

The nozzle 532A may be vibrated in a manner similar to the embodiment of FIG. 31 or may rely only on the force of the pump 334 to cause a continuous substantially uniform gel-chemical additive to be applied. In one embodiment, the nozzle 532A is cut away at 540A to provide an open top channel to receive gel and the nozzle 540 of the separator is positioned to direct air under pressure directly at the open top of the channel and thus form a mist of gel-additive spray that is uniformly spread over any area. The opening is adjusted so that chemical additives are economically used and may be contained by the gel at a concentration such that uniform and adequate distribution with the gel is obtained at the appropriate rate by controlling the pump speed, size of nozzle 532A and speed of movement across a field with respect to the concentration.

Figure 44:
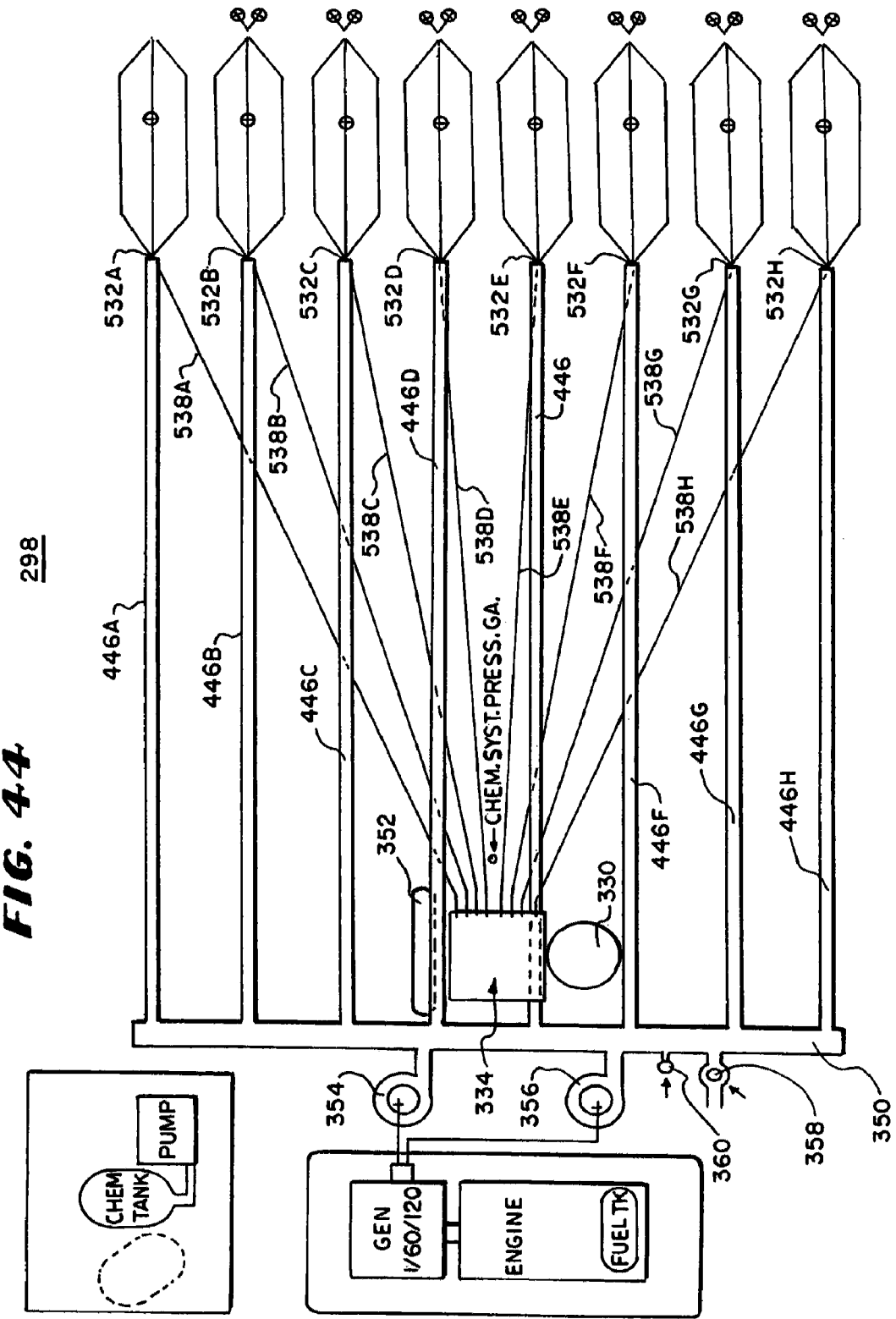
FIG. 44 is a schematic plan view of system for supplying chemical additives to fields.

In FIG. 44, there is shown a chemical dispensing system 498 adapted to be pulled across a field to provide additives having the pump 334, the chemical tank 330, an air manifold 350, a ground wheel drive 352, the air lines 446A-446H, the chemical lines 538A-538H and the nozzles 532A-532H. The pump 534 is driven by the ground wheel 352 to pump a gel-additive matrix through the lines 538A-538H. Air from two blowers 354 and 356 pressurize the manifold 550 to a pressure controlled by air pressure adjustment valve 358 as measured by an air pressure gauge 360. Air under pressure is applied through the air lines 446A-446H to the nozzles 532A-532H to spray droplets of the gel and chemical additive.

This system has the advantage of: (1) reducing the amount of chemical additive and carrier because it is viscous and may be slowly but evenly distributed; and (2) is not susceptible of clogging because reasonable size nozzle openings may be used and the viscous gel may he expelled through them with substantial force to keep them clear without using excessive amounts of gel or additive. Before operating the planter of FIGS. 23-43 of this invention, seeds having characteristics suitable for fluid drilling are selected. The seeds may be activated initially through priming, dried to terminate activation, stored until planting time, mixed with a gel and then fed from a planter as the planter traverses the field in properly spaced orientation for rapid germination and emergence.

To precondition the seeds, the seeds are permitted to absorb water at proper germination temperatures as described by Bredford, Kent J. "Seed Priming: Techniques to Speed Seed Germination", Proceedings of the Ore on Horticultural Society, 1984, v. 25, pp. 227-233. After reaching activation but prior to growth, the seeds are removed from the priming system and dried.

Prior to planting, a gel is prepared from commercial powders such as those sold by Hercules, Inc., 910 Market Street, Wilmington, Del., under the trademark "NATROSOL" (hydroxyethylcellulose). Generally, the gel is prepared in the manner described by the manufacturer which, in the preferred embodiment, is Hercules, Inc., as described in their Bulletin 450-11 revision 10-80m 10M07640H entitled NATROSOL.

The viscosity of the gel used in fluid drilling in accordance with this invention when Natrosol is the gel agent should be between 800 and 5000 centipoise. Preferably, for relatively small seeds such as cabbage, the mixture is prepared to yield soft gel having a viscosity of between 1,800 and 2,000 centipoise; for medium sized seeds a medium strength gel having a viscosity of between 2,500 to 3,000 centipoise and for large seeds, a heavy strength, having a viscosity of between 3,000 to 4,000 centipoise. The volume of gel to seed is in a range of ratios of between 1 to 1 and 4 to 1 and preferably a range of 3 to 1 for small seeds. The seeds and gel are preferably mixed together within three hours before planting. Additives such as microorganisms having beneficial effects on the plants may be added to infect the seeds or pesticides and fertilizers or growth hormones may be added to the gel at the same time it is mixed or after but before planting. The matrix of seeds and gel are mixed and put into the feed hoppers 476A and 476B as shown in FIGS. 23, 24, 25, 26, 30, 41, and 42. In each case, at least one gallon of matrix to 20 gallons of matrix and include a head of pressure of at least five pounds.

Beneath the gel, is a drive mechanism for the feeder which includes means for moving pockets of gel and seed as groups along at least partially enclosing surfaces to reduce the amount of motion between gel surfaces and solid surfaces. The hopper into which the gel is formed generally requires surfaces arranged to reduce the removal of seeds by friction against the surfaces during flow of the material. Similarly, the drive mechanism is designed to have a reduced area of contact between solid surfaces and the moving surface of the gel and for this purpose, an auger is used. To avoid plugging of the auger by reducing the separation of seeds and gel, the helical grooves in the auger are between ¼ inch and ½ inch in depth and between ⅛ inch and 1½ inches between threads, with the threads being no more than ⅓ of the distance between threads in thickness and no less than ⅕ of the depth of the grooves. With this arrangement, a relatively pulseless flow is provided of pockets of gel with a relatively small moving surface of insufficient velocity to cause substantial separation of seeds.

As the auger carriers pockets of matrix of gel and seed through a distribution tube toward a feed nozzle, the threads of the augers approach the edge of the bottom seed section or the hopper, whichever is first, but approach it in a parallel fashion with an angle corresponding to the angle of the hopper. This prevents the squeezing of seeds and cracking of the seeds as they pass into the auger delivery tube in the bottom feed section 478A (FIG. 31). The seeds are conveyed by the auger to an end thread which is at a relatively sharp angle to thrust the gel forward through the vibrating nozzle. As the seeds and gel pass through the orifice in the nozzle, there is a tendency for them to accumulate. However, air under pressure blows downwardly with a pressure of at least one-tenth of a pound per square inch and 20 pounds per square inch across the nozzle in a direction along a plane passing through the longitudinal axis of the delivery tube and perpendicular to the ground, with the air flow being at an angle to the ground no more than 60 degrees on either side of a normal in a plane along the longitudinal axis of the auger and no more than 30 degrees from the normal to the ground in a plane perpendicular to the longitudinal axis of the auger.

The hopper and feed mechanism are pulled along a field during the delivery of seeds and include a furrow opener and modified widening shoe for larger seeds, which spreads the earth into a wide furrow. Furrow closing and pressing wheels close the furrow and, in one embodiment, control the rate of rotation of the auger so as to adjust the dispensing of seeds to the speed of the tractor. In other embodiments, the seeds are detected or the rate of turning of the auger is detected and displayed to the tractor operator who pulls the planter at a speed corresponding to auger speed and approximately five miles an hour.

For certain seeds which are relatively large and planted deeper, such as sweet corn, the furrow opener has mounted to it a blade extending downwardly an additional inch to create a deeper groove for the seed to drop further into the furrow. In embodiments of planter which are intended to drop seeds through spaced apart apertures in plastic or the like for accurate stands, a solenoid operated blocking device is timed to block air until the seed is about to be dispensed and then move the blocking plate away so that the air will blow matrix and seed into the aperture in the plastic. While an individual auger has been described through the center of a single hopper, multiple augers may be utilized positioned so that the gel flows into the auger with adequate pressure. In such a case, each auger will terminate in a separate nozzle vibrated by a vibrator and utilizing a separator. It is possible to use one vibrator to vibrate several nozzles.

From the above description, it can be understood that the planting apparatuses and methods of this invention have several advantages such as: (1) there is less damage to seed because of the controlled priming up take; (2) it is economical in the use of gel per acre; (3) there is less damage to seeds from lack of oxygen or drowning or the like; (4) the seeds may be controlled for spacing in a superior manner during drilling; (5) there is good control over uniformity in the time of emergence of the plants from the seeds; and (6) the process is economical.

From the above description, it can be understood that the spray method and apparatus of this invention has several advantages such as for example: (1) vehicles and aircraft used for applying agricultural inputs to fields to do not need to carry as heavy a load of carrier fluid to apply agricultural inputs, for example, they can carry the same active ingredients as prior art agricultural inputs with a reduction in water of as much as 90 percent; (2) they reduce or eliminate the requirement for periodic addition of carrier fluid, thus reducing the time and expense of spraying; (3) they permit the application of some beneficial microbes with seeds because the agricultural inputs containing microbes can be applied at pressures low enough to avoid killing the microbes; (4) the high viscosity, relatively large drop size and narrow size distribution of the agricultural inputs reduce drift when sprayed; (5) it is possible to avoid diluting agricultural inputs with carriers such as water that have high surface tension and form beads on contact rather than spreading such over a leaf; 6) drops of agricultural inputs with greater shear resistance can be used to reduce the breaking up of the drops and the resulting increase in drop size distribution, reduction in drop size and increased drift; (7) it is not necessary to add carriers used for dilution, such as water, that have unpredictable mineral content and pH variations; (8) the tendency for active ingredients to precipitate out because of the addition of carriers is reduced; and (9) in some embodiments, the particle size of active ingredients can be reduced and thus provide better penetration into a host.

It can be further understood from the above description that the planter in accordance with this invention has several advantages such as: (1) it can provide effective fluid drilling with adequate separation of seeds; (2) it can provide planting of seeds with superior beneficial microbe inoculation characteristics; (3) it can combine effective planting with beneficial chemical and microbial additives; (4) it provides good separation of seeds being planted without repeated mixing of the fluid and the seeds; (5) there is less damage to seed because of controlled priming in the presence of air and controlled water uptake; (6) it is economical in the use of gel per acre; (7) there is less damage to seeds in the planting operation; (7) the seeds may be controlled for spacing in a superior manner during drilling; (8) there is good control over uniformity in time of emergence of the plants from the seeds; and (9) it permits protection of the seed and addition of additives economically.

It can also be understood from the above description that the method, formulations and apparatus for forming fibers in accordance with this invention have several advantages, such as: (1) longer fibers can be formed; (2) chitosan fibers, mats and sheets can be more economically and better formed; and (3) fibers can be formed without electrospinning.

While a preferred embodiment of the invention has been described with some particularity, many modifications and variations in the preferred embodiment are possible without deviating from the invention. Therefore, it is to be understood that, within the scope of the appended claims, the invention may be practiced other than as specifically described.

What is claimed is:

1. A method of forming fibers comprising the steps of:

forming at least one formable material containing a solvent;

causing movement of individual streams of the at least one formable material and solvent into a working zone;

stretching the streams into fibers with at least one fluid energy field and an electric potential;

drying the fibers by evaporation of the solvent during stretching of the fibers and collecting the fibers after they have been dried wherein the formable material is a compatibly-selected feedstock material;

the step of causing movement of individual streams of the at least one formable material into a working zone comprises the substeps of:

bringing the compatibly-selected feedstock material and at least one moving compatibly-selected kinetic energy fluid in contact with each other;

said substep of bringing the compatibly-selected feedstock material and at least one moving compatibly-selected kinetic energy fluid in contact with each other comprising the further breakdown of adjusting at least one of a pressure of the at least one moving compatibly-selected kinetic energy fluid, a velocity of the at least one moving compatibly-selected kinetic energy fluid, a velocity of the compatibly-selected feedstock material, a thickness of the compatibly-selected feedstock material, a width of the at least one moving compatibly-selected kinetic energy fluid, a width of the compatibly-selected feedstock material, a temperature of the compatibly-selected feedstock material, and a viscosity of the compatibly-selected feedstock material, wherein the feedstock material drys to a hardened condition at a selected length and thinness;

the step of bringing the compatibly-selected feedstock material and at least one moving compatibly-selected kinetic energy fluid in contact with each other comprises the step of bringing at least one viscous liquid and the at least one moving compatibly-selected kinetic energy fluid in contact with each other;

the step of stretching the streams into fibers with at least one fluid energy field and an electric potential comprises the step of extruding viscous material through at least one needle opening while a high potential is applied wherein nano fibers are prepared;

the step of extruding viscous material through at least one needle opening while a high potential is a lied corn rises the step of extruding a chitosan solution through the at least one needle opening;

the step of drying and collecting the fibers comprises the step of collecting the fibers on a rotating collector;

the step of extruding a chitosan solution through the at least one needle opening comprises the step of extruding the chitosan solution through a plurality of needle openings at a rate between 2 and 7 micrometers per minute as controlled by a regulator in the presence of a gradient extending over a distance between 5 and 10 centimeters of 4 to 600 volts per centimeter.

2. A method of forming fibers comprising the steps of:
forming at least one formable material containing a solvent, wherein the step of forming at least one formable material comprises the steps of:
  dissolving chitosan in an acidic liquid, whereby the formable material containing chitosan is obtained; and
  displacing at least some of the acid from the acidic solution while maintaining a pH of the formable material containing chitosan low enough to avoid chitosan precipitation;
causing movement of at least one individual stream of the at least one formable material and solvent into a working zone;
stretching the streams into nano fibers with at least two fluid energy fields having different velocities; and
drying the fibers by evaporation of the solvent during stretching of the streams into nano fibers and collecting the nano fibers after they have been dried.

3. A method in accordance with claim 2 further including the step of adding sufficient organic solvent to lower conductivity to a level that permits electrospinning.

4. A method in accordance with claim 2 further including the step of adding sufficient organic solvent to reduce viscosity to a level that permits formation of long fibers comprising the substeps of:
  dissolving chitosan powder that is in a water suspension in glacial acetic acid;
  bubbling carbon dioxide through chitosan solution; and
  adding an organic solvent to reduce conductivity, surface tension and viscosity until the chitosan solution is suitable for forming fibers.

5. A method of forming fibers comprising the steps of:
forming at least one formable material containing a solvent:
causing movement of at least one individual stream of the at least one formable material and solvent into a working zone:
stretching the streams into nano fibers with at least two fluid energy fields having different velocities;
drying the fibers by evaporation of the solvent during stretching of the streams into nano fibers and collecting the nano fibers after they have been dried;
the step of stretching the streams into nano fibers with at least two fluid energy fields comprises the step of extruding viscous material through at least one needle opening wherein the nano fibers are prepared;
the step of extruding viscous material through at least one needle opening includes the step of extruding a chitosan solution through the at least one needle opening;
the step of extruding a chitosan solution through the at least one needle opening comprises the step of extruding the chitosan solution through a plurality of needle openings at a rate between 2 and 7 micrometers per minute as controlled by a regulator in the presence of gradient extending over a distance between 5 and 10 centimeters of 4 to 600 volts per centimeter.

6. A method in accordance with claim 5 wherein the step of drying and collecting the fibers comprises the step of forming the fibers into a mat.

7. A method in accordance with claim 6 wherein the step of extruding the chitosan solution through a plurality of needle openings includes the step of extruding the chitosan solution in the absence of an electric field whereby a mat of oriented fibers is formed.

8. A method in accordance with claim 5 further including the step of adding a surfactant while bubbling the carbon dioxide through the chitosan solution.

9. A method in accordance with claim 5 further including the step of adding ethanol to the chitosan solution.

10. A method in accordance with claim 5 further including the step of adding poly(ethylene oxide) to the chitosan solution.

* * * * *